United States Patent
Spivak et al.

(10) Patent No.: US 8,997,078 B2
(45) Date of Patent: Mar. 31, 2015

(54) RELEASE LIFECYCLE MANAGEMENT SYSTEM FOR A MULTI-NODE APPLICATION

(75) Inventors: Vadim Spivak, Emerald Hills, CA (US); Kent Skaar, Stow, MA (US); Oleg Shaldibin, Palo Alto, CA (US)

(73) Assignee: Pivotal Software, Inc., Palo Alto, CA (US)

( * ) Notice: Subject to any disclaimer, the term of this patent is extended or adjusted under 35 U.S.C. 154(b) by 323 days.

(21) Appl. No.: 13/428,125

(22) Filed: Mar. 23, 2012

(65) Prior Publication Data

US 2012/0266156 A1 Oct. 18, 2012

Related U.S. Application Data

(60) Provisional application No. 61/474,669, filed on Apr. 12, 2011.

(51) Int. Cl.
*G06F 9/44* (2006.01)
*G06F 9/445* (2006.01)
*H04L 29/08* (2006.01)
*G06F 9/50* (2006.01)
*G06F 9/455* (2006.01)

(52) U.S. Cl.
CPC .............. *H04L 67/34* (2013.01); *G06F 9/5055* (2013.01); *H04L 67/10* (2013.01); *G06F 8/68* (2013.01); *G06F 9/45533* (2013.01)
USPC ............ 717/168; 717/171; 717/173; 717/174

(58) Field of Classification Search
CPC . G06F 9/45558; G06F 8/65; G06F 2201/815; G06F 9/45533; G06F 8/61; G06F 9/5055; G06F 8/60; G06F 8/71
See application file for complete search history.

(56) References Cited

U.S. PATENT DOCUMENTS 6,266,809 B1 * 7/2001 Craig et al. ................... 717/173
6,609,128 B1    8/2003 Underwood
(Continued)

FOREIGN PATENT DOCUMENTS

EP    2 299 360       3/2011
EP    2 381 363       10/2011
JP    2007-507046 A   3/2007

OTHER PUBLICATIONS

MichadeL Armbrust et al., A view of cloud computing, 2010 ACM, pp. 50-58; <http://dl.acm.org/citation.cfm?id=1721672>.*

(Continued)

*Primary Examiner* — Thuy Dao
*Assistant Examiner* — Cuong V Luu
(74) *Attorney, Agent, or Firm* — Fish & Richardson P.C.

(57) ABSTRACT

A deployment system provides the ability to deploy a multi-node distributed application, such as a cloud computing platform application that has a plurality of interconnected nodes performing specialized jobs. The deployment system may update a currently running cloud computing platform application according to a deployment manifest and a versioned release bundle that includes jobs and application packages. The deployment system determines changes to the currently running cloud computing platform application and distributes changes to each job to deployment agents executing on VMs. The deployment agents apply the updated jobs to their respective VMs (e.g., launching applications), thereby deploying an updated version of cloud computing platform application.

17 Claims, 9 Drawing Sheets

(56) References Cited

U.S. PATENT DOCUMENTS

| | | | |
|---|---|---|---|
| 6,976,093 B2 | 12/2005 | Lara et al. | |
| 7,024,668 B2 | 4/2006 | Shiomi et al. | |
| 7,275,244 B1 | 9/2007 | Charles Bell et al. | |
| 7,356,679 B1 | 4/2008 | Le et al. | |
| 7,370,322 B1 | 5/2008 | Matena et al. | |
| 7,533,381 B2 | 5/2009 | Ando | |
| 7,577,722 B1 | 8/2009 | Khandekar | |
| 7,634,488 B2 | 12/2009 | Keys et al. | |
| 7,874,008 B2 | 1/2011 | Chang et al. | |
| 7,971,059 B2 | 6/2011 | Calman et al. | |
| 8,091,084 B1 | 1/2012 | Dobrovolskiy et al. | |
| 8,108,912 B2 | 1/2012 | Ferris | |
| 8,176,094 B2 | 5/2012 | Friedman | |
| 8,176,559 B2 | 5/2012 | Mathur et al. | |
| 8,201,237 B1 | 6/2012 | Doane et al. | |
| 8,225,093 B2 | 7/2012 | Fok et al. | |
| 8,327,357 B2* | 12/2012 | Amsden | 718/1 |
| 8,359,594 B1* | 1/2013 | Davidson et al. | 718/1 |
| 8,375,360 B2 | 2/2013 | I'Anson | |
| 8,407,689 B2 | 3/2013 | Dournov et al. | |
| 8,429,630 B2 | 4/2013 | Nickolov et al. | |
| 8,578,375 B2 | 11/2013 | Pagan et al. | |
| 8,584,119 B2 | 11/2013 | Ellington et al. | |
| 8,601,226 B1 | 12/2013 | Lappas et al. | |
| 8,627,310 B2 | 1/2014 | Ashok et al. | |
| 8,682,957 B2 | 3/2014 | Elson et al. | |
| 2002/0174421 A1* | 11/2002 | Zhao et al. | 717/174 |
| 2002/0178254 A1 | 11/2002 | Brittenham et al. | |
| 2003/0061247 A1 | 3/2003 | Renaud | |
| 2004/0030710 A1 | 2/2004 | Shadle | |
| 2004/0183831 A1 | 9/2004 | Ritchy et al. | |
| 2005/0022198 A1 | 1/2005 | Olapurath et al. | |
| 2005/0198303 A1 | 9/2005 | Knauerhase et al. | |
| 2005/0257206 A1* | 11/2005 | Semerdzhiev et al. | 717/168 |
| 2005/0278518 A1* | 12/2005 | Ko et al. | 713/1 |
| 2005/0289536 A1 | 12/2005 | Nayak et al. | |
| 2006/0010176 A1 | 1/2006 | Armington | |
| 2006/0037071 A1 | 2/2006 | Rao et al. | |
| 2006/0079356 A1 | 4/2006 | Kodama et al. | |
| 2006/0136897 A1 | 6/2006 | Laxminarayan et al. | |
| 2006/0248522 A1 | 11/2006 | Lakshminarayanan et al. | |
| 2007/0058548 A1 | 3/2007 | Babonneau et al. | |
| 2007/0204262 A1* | 8/2007 | Ahluwalia et al. | 717/168 |
| 2007/0209035 A1 | 9/2007 | Sonderegger et al. | |
| 2008/0109788 A1 | 5/2008 | Prieto | |
| 2008/0163171 A1 | 7/2008 | Chess et al. | |
| 2008/0209016 A1 | 8/2008 | Karve et al. | |
| 2008/0244577 A1* | 10/2008 | Le et al. | 718/1 |
| 2008/0307414 A1 | 12/2008 | Alpern et al. | |
| 2009/0070752 A1 | 3/2009 | Alpern et al. | |
| 2009/0070853 A1 | 3/2009 | Chung et al. | |
| 2009/0100420 A1* | 4/2009 | Sapuntzakis et al. | 717/171 |
| 2009/0112919 A1 | 4/2009 | De Spiegeleer | |
| 2009/0172781 A1 | 7/2009 | Masuoka et al. | |
| 2009/0187995 A1 | 7/2009 | Lopatic et al. | |
| 2009/0216970 A1 | 8/2009 | Basler et al. | |
| 2009/0276771 A1 | 11/2009 | Nickolov | |
| 2009/0320012 A1* | 12/2009 | Lee et al. | 717/168 |
| 2009/0320019 A1 | 12/2009 | Ellington et al. | |
| 2010/0103837 A1 | 4/2010 | Jungck et al. | |
| 2010/0131590 A1 | 5/2010 | Coleman et al. | |
| 2010/0142447 A1 | 6/2010 | Schlicht et al. | |
| 2010/0146425 A1 | 6/2010 | Lance et al. | |
| 2010/0251328 A1 | 9/2010 | Syed et al. | |
| 2010/0257605 A1 | 10/2010 | McLaughlin et al. | |
| 2010/0281166 A1 | 11/2010 | Buyya et al. | |
| 2010/0318649 A1 | 12/2010 | Moore et al. | |
| 2010/0325624 A1 | 12/2010 | Bartolo et al. | |
| 2010/0333085 A1 | 12/2010 | Criddle et al. | |
| 2011/0004916 A1 | 1/2011 | Schiffman et al. | |
| 2011/0029947 A1 | 2/2011 | Markovic | |
| 2011/0055707 A1 | 3/2011 | Kimmet | |
| 2011/0055714 A1 | 3/2011 | Vemulapalli et al. | |
| 2011/0055828 A1* | 3/2011 | Amsden | 718/1 |
| 2011/0061046 A1 | 3/2011 | Phillips et al. | |
| 2011/0107411 A1 | 5/2011 | McClain et al. | |
| 2011/0126197 A1 | 5/2011 | Larsen et al. | |
| 2011/0145790 A1 | 6/2011 | Rajaraman et al. | |
| 2011/0145836 A1 | 6/2011 | Wheeler et al. | |
| 2011/0153684 A1 | 6/2011 | Yung | |
| 2011/0153727 A1 | 6/2011 | Li | |
| 2011/0153824 A1 | 6/2011 | Chikando et al. | |
| 2011/0167469 A1 | 7/2011 | Letca et al. | |
| 2011/0214124 A1 | 9/2011 | Ferris et al. | |
| 2011/0231552 A1 | 9/2011 | Carter et al. | |
| 2011/0258333 A1 | 10/2011 | Pomerantz et al. | |
| 2011/0258619 A1 | 10/2011 | Wookey et al. | |
| 2011/0276713 A1 | 11/2011 | Brand | |
| 2011/0302569 A1 | 12/2011 | Kunze et al. | |
| 2012/0072480 A1 | 3/2012 | Hays | |
| 2012/0084769 A1 | 4/2012 | Adi et al. | |
| 2012/0102481 A1 | 4/2012 | Mani et al. | |
| 2012/0159469 A1* | 6/2012 | Laor | 717/173 |
| 2012/0240135 A1 | 9/2012 | Risbood et al. | |
| 2012/0254850 A1* | 10/2012 | Hido et al. | 717/168 |
| 2012/0266159 A1 | 10/2012 | Risbood et al. | |
| 2012/0324116 A1 | 12/2012 | Dorai et al. | |
| 2013/0006689 A1 | 1/2013 | Kinnear et al. | |
| 2013/0041931 A1 | 2/2013 | Brand | |
| 2013/0185715 A1 | 7/2013 | Dunning et al. | |
| 2013/0227091 A1 | 8/2013 | Tompkins | |
| 2013/0232480 A1 | 9/2013 | Winterfeldt et al. | |

OTHER PUBLICATIONS

H. Andres Lagar-Cavilla et al.; SnowFlock Rapid Virtual Machine Cloning for Cloud Computing; 2009 ACM; pp. 1-12; <http://dl.acm.org/citation.cfm?id=1519067>.*

Matthias Schmidt et al.; Efficient distribution of virtual machines for cloud computing; 2010 IEEE; pp. 567-574; <http://ieeexplore.ieee.org/stamp/stamp.jsp?tp=&arnumber=5452476>.*

Jacob Gorm Hansen et al.; Lithium Virtual Machine Storage for the Cloud ; 2010 ACM; pp. 15-26; <http://dl.acm.org/citation.cfm?id=1807134>.*

Dave Thomas; Enabling Application Agility—Software as a Service, Cloud Computing and Dynamic Languages; 2008 JOT; pp. 29-32; <http://www.jot.fm/issues/issue_2008_05/column3.pdf>.*

Feng Liu et al.; SaaS Integration for Software Cloud; 2010 IEEE; pp. 402-409; <http://ieeexplore.ieee.org/stamp/stamp.jsp?tp=&arnumber=5557968>.*

Partial European Search Report for Application No. 11163533.0, dated Jul. 19, 2011, 6 pages.

Goodwill, James: "Java Web Applications", O'Reilly, Mar. 15, 2001, pp. 1-3, XP002646828, Retrieved from the Internet: URL: http://onjava.com/lpt/a/671 [retrieved on Jun. 30, 2011].

Goodwill, James: "Deploying Web applications to Tomcat", O'Reilly, Apr. 19, 2001, pp. 1-11, XP002646829, Retrieved from the Internet: URL: http://oreilly.com/lpt/a/780 [retrieved on Jun. 30, 2011].

Laurent Tonon: "Tomcat Architecture Diagram", Apr. 26, 2011, p. 1, XP002646830, Retrieved from the Internet: URL: http://marakana.com/forums/tomcat/general/106.html [retrieved on Jul. 1, 2011].

Leitner P. Application Level Performance Monitoring of Cloud services, Dec. 2012, vol. 9, pp. 1-8.

White page of BMC software, "Virtualization management with BMC and VMware" © 2011 BMC software, 2 pages.

Wei et al., "Managing security of virtual machine images in a cloud environment", Nov. 13, 2009, 6 pages.

Hansen et al., "Scalable Virtual machine storage using local disks", Dec. 2010, 9 pages.

Sun et al., "Simplifying Service Deployment with Virtual Appliances", 2008 IEEE International Conference on Services Computing, Jul. 7, 2008, pp. 265-272.

International Search Report dated Jun. 28, 2012 in counterpart PCT application PCT/US2012/033356, filed Apr. 12, 2012, with written opinion.

* cited by examiner

RELEASE LIFECYCLE MANAGEMENT SYSTEM FOR A MULTI-NODE APPLICATION

CROSS-REFERENCE TO RELATED APPLICATIONS

The present application claims the benefit and priority of U.S. provisional patent application Ser. No. 61/474,669, filed on Apr. 12, 2011, and entitled "DEPLOYMENT FRAMEWORK FOR CLOUD PLATFORM ARCHITECTURE," which is hereby incorporated by reference. The present application is related to the patent application entitled "Deployment System for Multi-Node Applications" Ser. No. 13/428,109, and the patent application entitled "Release Management System for a Multi-Node Application" Ser. No. 13/428,121, which are assigned to the assignee of this application and have been filed on the same day as this application.

BACKGROUND

"Platform-as-a-Service" (also commonly referred to as "PaaS") generally describes a suite of technologies provided by a service provider as an integrated solution that enables a web developer (or any other application developer) to build, deploy and manage the life cycle of a web application (or any other type of networked application). One primary component of PaaS is a "cloud-computing platform" which is a network (e.g., Internet, etc.) infrastructure run and maintained by the service provider upon which developed web applications may be deployed. By providing the hardware resources and software layers required to robustly run a web application, the cloud computing platform enables developers to focus on the development of the web application, itself, and leave the logistics of scalability and other computing and storage resource requirements (e.g., data storage, database access, processing power, facilities, power and bandwidth, etc.) to the cloud computing platform (e.g., at a cost charged by the service provider). A service provider may additionally provide a plug-in component to a traditional IDE (i.e., integrated development environment) that assists a developer who creates web applications using the IDE to properly structure, develop and test such applications in a manner that is compatible with the service provider's cloud computing platform. Once the developer completes a web application using the IDE, the plug-in component assists the developer in deploying the web application into the cloud computing platform.

However, due to complexities in providing flexible and scalable cloud computing platforms, PaaS is offered by few service providers. Current implementations of cloud computing platforms use multiple components (e.g., cloud controller, health manager, service provisioner, router, and application execution agents) that perform different roles and coordinate amongst each other to provide cloud computing services. To deploy such a cloud computing platform, a system administrator must build, configure, deploy, and maintain each of the components (e.g., cloud controller, health manager, service provisioner, router, and application execution agents). While deployment may be performed manually when installing all components on a single system (e.g., laptop, server), the deployment process becomes challenging when the components are installed across a plurality of networked systems because, in such installations, each system must be provisioned with specific computing resources, set up with a particular networking configuration, and have a different software application installed with dependent libraries and/or runtimes to perform the system's assigned role within the cloud computing platform. Additionally, updating any of the components (e.g., security patch for a library or operating system) requires a system administrator to have to modify operations for other components in the cloud computing platform. For example, when one of the components needs to be updated, a system administrator may have to suspend operations of other components currently connected to the component, or, in another example, update settings of other components to correctly connect to the updated component. Accordingly, the deployment process for a multi-node application such as a cloud computing platform may be too complex and time-consuming for a system administrator to manage.

SUMMARY

One or more embodiments of the present invention provide a deployment system for a multi-node distributed application (e.g., a cloud computing platform) having any number of nodes that perform specialized roles, as well as any dependent software and/or networking, storage, and service configurations utilized for each specialized role. Instances of the deployment system may be implemented on top of a hardware infrastructure that allows for dynamic provisioning of computing resources, such as a virtualized infrastructure. The deployment system includes an automation framework that utilizes codified deployment manifests to automatically provision infrastructure (e.g., virtual machines), as well as install and configure application packages needed for each specialized role. The codified deployment manifests simplify the deployment process for a complex multi-node application having varying requirements and enables repeatable and predictable deployments.

A method for updating an application having a plurality of functional components that are executed on a plurality of different virtual machines (VMs) includes, according to an embodiment, receiving, by a deployment module, a specification for the application to be updated. The specification identifies a set of software components representing an updated version of the application and containing code which implements each of the functional components of the application. The method includes identifying at least one functional component that is to be updated by comparing the set of software components for the updated version of the application and a set of software components that have been deployed for a currently-deployed application. The method further includes directing an agent in each of the VMs that is executing as an instance of the identified functional component to install one or more software components in the VM, thereby causing the VM to execute as an updated instance of the functional component of the application.

A non-transitory computer-readable storage medium comprising instructions that, when executed in a computing device, update an application having a plurality of functional components that are executed on a plurality of different virtual machines (VMs). The instructions, according to an embodiment, perform the steps of receiving, by a deployment module, a specification for the application to be updated, wherein the specification identifies a set of software components representing an updated version of the application and containing code which implements each of the functional components of the application. The instructions further perform the steps of identifying at least one functional component that is to be updated by comparing the set of software components for the updated version of the application and a set of software components that have been deployed for a currently-deployed application, and directing an agent in each of the VMs that is executing as an instance of the identified functional component to install one or more software components in the VM, thereby causing the VM to execute as an updated instance of the functional component of the application.

A computer system for updating an application having a plurality of functional components that are executed on a plurality of different virtual machines (VMs) comprises a system memory and a processor. The processor, according to an embodiment, is programmed to carry out the steps of receiving, by a deployment module, a specification for the application to be updated. The specification identifies a set of software components representing an updated version of the application and containing code which implements each of the functional components of the application. The processor is further programmed to carry out the steps of identifying at least one functional component that is to be updated by comparing the set of software components for the updated version of the application and a set of software components that have been deployed for a currently-deployed application, and directing an agent in each of the VMs that is executing as an instance of the identified functional component to install one or more software components in the VM, thereby causing the VM to execute as an updated instance of the functional component of the application.

DETAILED DESCRIPTION

Figure 1:
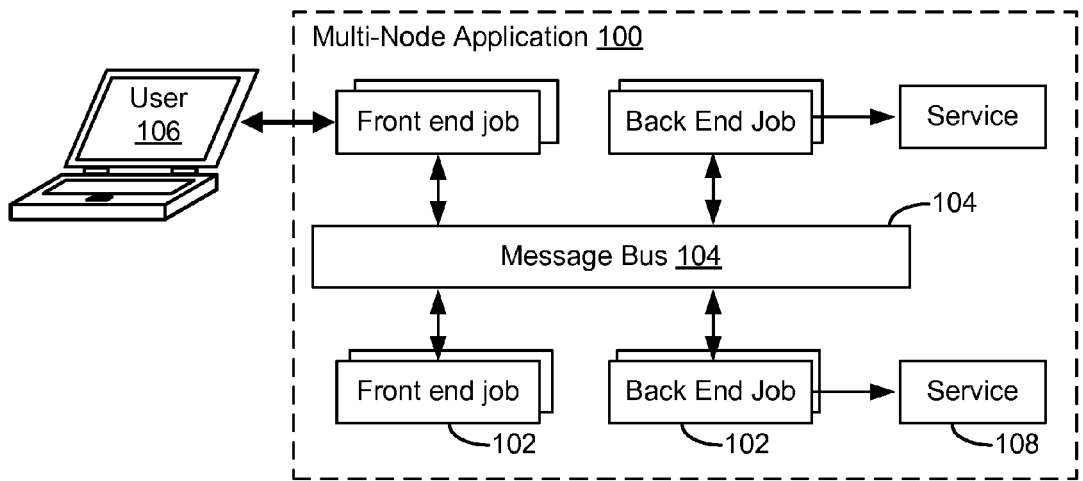
FIG. 1 depicts a generalized schematic diagram of a multi-node distributed application.

FIG. 1 depicts a generalized schematic diagram of a multi-node distributed application 100. Multi-node application 100 includes a plurality of nodes 102 (e.g., front and back end jobs) in communication via a message bus 104 to provide application services to a user 106. Each node 102 executes as an instance of a functional component and includes component software applications and/or libraries to perform one or more specialized tasks of the functional component within multi-node application 100. As described above, set-up and deployment of multi-node application 100 may be complex. For example, as each of the plurality of nodes 102 may serve different roles within multi-node application 100, nodes 102 may be on different networks, be connected to multiple dependent services 108, use different component software applications, have different resource requirements, and so forth.

Figure 2:
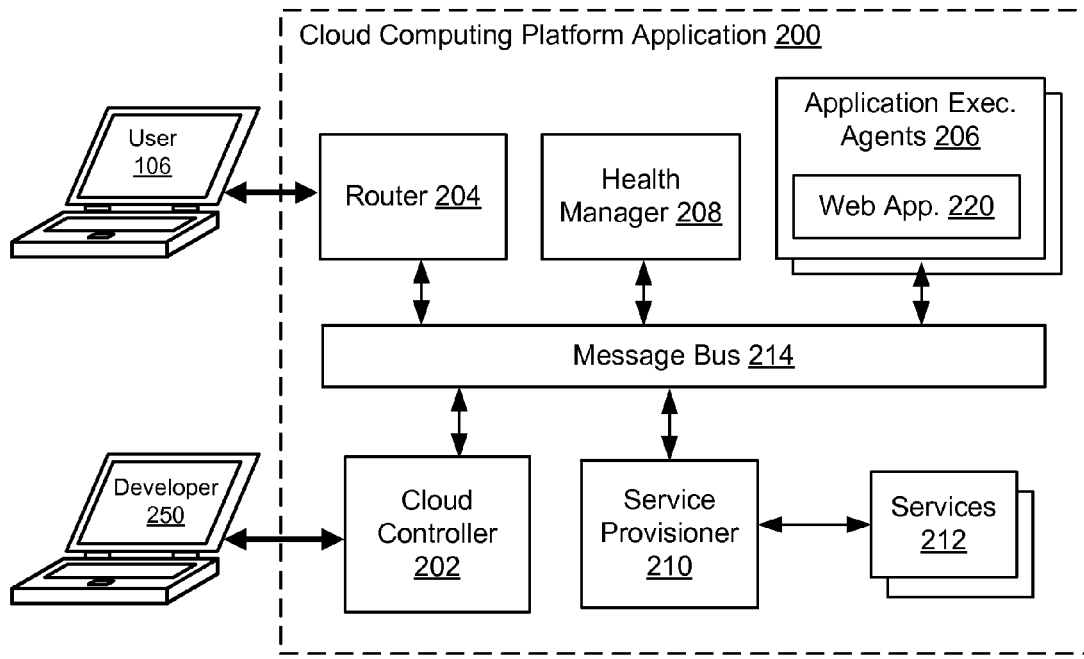
FIG. 2 depicts one example of the multi-node distributed application of FIG. 1, namely, a cloud computing platform application.

FIG. 2 depicts a cloud computing platform application 200, which may be one example of a multi-node application 100, which dynamically provides cloud computing services to be utilized to host web applications 220. One example of cloud computing platform application 200 is described further in U.S. patent application Ser. No. 12/767,010, filed Apr. 26, 2010, and entitled "Cloud Platform Architecture," which is hereby incorporated by reference in its entirety. Cloud computing platform application 200 includes specialized functional components, such as a cloud controller 202, a router 204, application execution agents 206, a health manager 208, a service provisioner 210, services 212, and a message bus 214. These functional components operate in a coordinated manner to provide cloud computing services, such as a relational database services (e.g., MySQL, etc.), CRM (customer relationship management) services, web services, application server services (e.g., JBoss, Rails, etc.), monitoring services, background task schedulers, logging services, messaging services, memory object caching service, and any other suitable software services, that may be accessed by web applications 220.

In one embodiment, cloud controller 202 orchestrates a deployment process for web applications 220 submitted by a developer 250. Cloud controller 202 interacts with other functional components of cloud computing platform application 200 to bind services required by submitted web applications 220 and package web applications for transmission to application execution agents 206 for deployment. Health manager 208 tracks and maintains the "health" of cloud computing platform application 200 by monitoring messages broadcast on message bus 214 by other functional components of cloud computing platform application 200. Web applications 220 access a set of services 212 provided by cloud computing platform application 200, such as a relational database service (e.g., MySQL, etc.), monitoring service, background task scheduler, logging service, messaging service, memory object caching service and the like. A service provisioner 210 serves as a communications intermediary between services 212 and other functional components of cloud computing platform application 200 (e.g., cloud controller 202, health manager 208, router 204, etc.) and assists with the task of provisioning or binding such available services to web applications 220 during a web application deployment process. Message bus 214 provides a common interface through which functional components of cloud computing platform application 200, such as service provisioner 210, cloud controller 202, health manager 208, router 204 and application execution agents 206, can communicate and receive notifications.

Once cloud controller 202 successfully orchestrates the deployment of web application 220 in one or more application execution agents 206, an end user 106 can access web application 220, for example, through a web browser or any other appropriate client application residing on a computer laptop or, generally, any computing device. Router 204 receives the web browser's access request (e.g., a uniform resource locator or URL) and routes the request to the corresponding system which hosts web application 220.

As described, each component has a separate role within cloud computing platform application 200 with separate software application and library dependencies (e.g., MySQL, Redis, MongoDB, Apache) and is specially built, configured, deployed, and maintained for cloud computing platform application 200 to function as a whole. Further, since each component is typically run in one or more virtual machines (VMs), each VM is also specially provisioned, configured, deployed, and maintained by a system administrator. As such, cloud computing platform application 200, in which web applications 220 are deployed, itself has a deployment procedure that is cumbersome and complex. Accordingly, embodiments provide a deployment technique for cloud computing platform application that uses an automation framework and tooling for simplified, automatic, and repeatable deployments.

Example Deployment System

Figure 3:
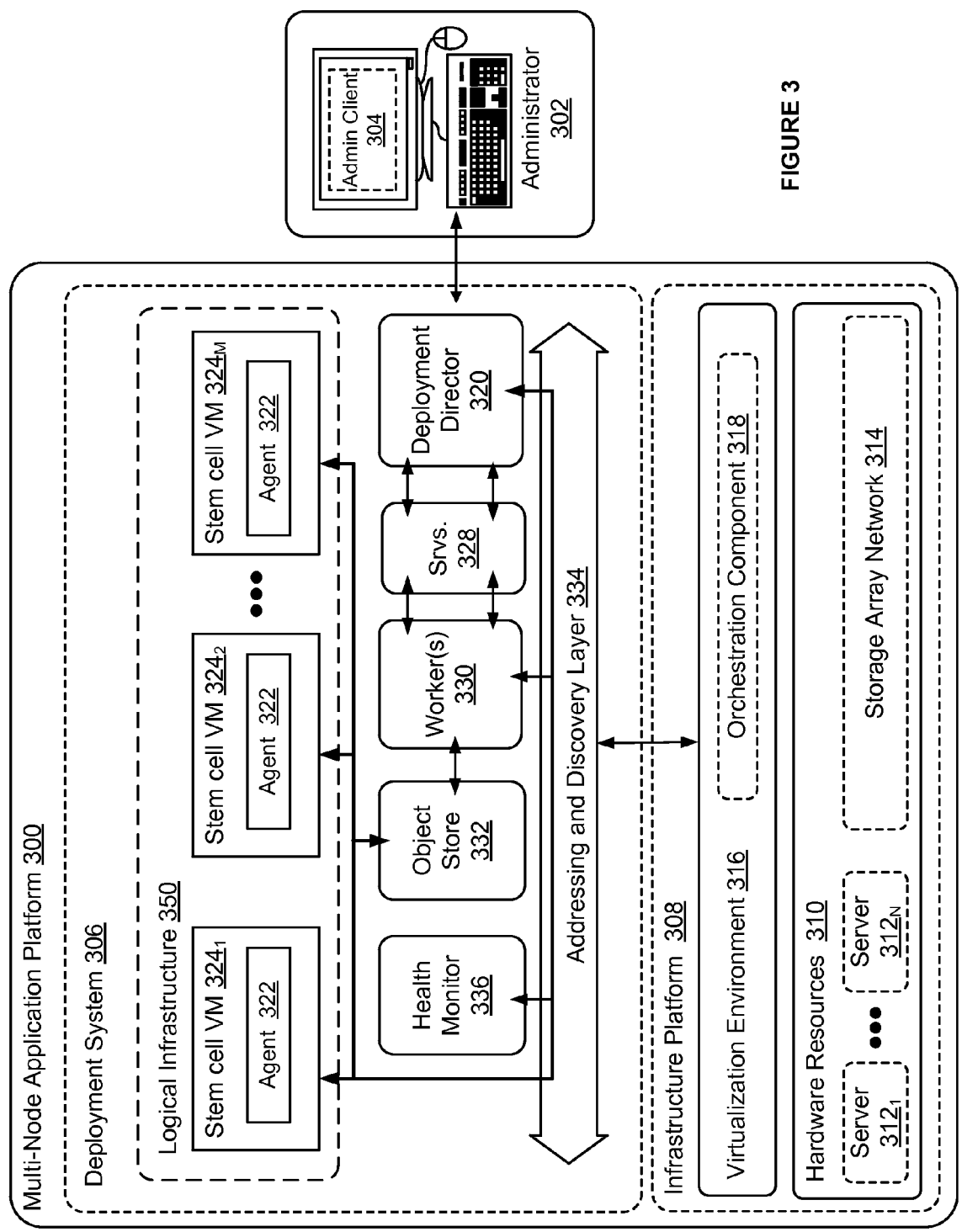
FIG. 3 depicts one embodiment of a deployment system for a multi-node distributed application.

FIG. 3 depicts one embodiment of a multi-node application platform 300 having a deployment system 306 for deploying a multi-node distributed application. For example, a system administrator 302 may utilize multi-node application platform 300 to deploy cloud computing platform application 200 of FIG. 2, in which web applications 220 may be deployed.

In one embodiment, system administrator 302 instructs deployment system 306 by issuing one or more commands through an administrative client 304 communicatively connected to deployment system 306, for example, through a command line interface (CLI) or other user interface of administrative client 304. In addition to transmitting one or more commands issued by system administrator 302, administrative client 304 may further transmit a bundle of application data, configuration files, and other information (collectively referred to as a "release" or "release bundle"), which are unpacked, processed, and/or distributed by deployment system 306 to deploy cloud computing platform application 200, as described later in conjunction with FIG. 7. In addition to the release, administrative client 304 provides a deployment manifest, associated with the release, that describes a desired computing environment of cloud computing platform application 200 after cloud computing platform application 200 has been deployed. The deployment manifest describes attributes of the desired computing environment such as a number of resource pools (e.g., groups of VMs) to be utilized, networks to be set up, and other settings, as will be described later, and functions as a specification for deployment in this embodiment.

Multi-node application platform 300 includes an infrastructure platform 308 upon which cloud computing platform application 200 is deployed and executed. In the embodiment of FIG. 3, infrastructure platform 308 comprises hardware resources 310, such as servers $312_1$ to $312_N$ and one or more storage array networks (SAN), such as SAN 314, which are configured in a manner to provide a virtualization environment 316 that supports execution of a plurality of virtual machines (VMs) across servers $312_1$ to $312_N$. As further detailed below, these VMs provide virtual computing resources that support the services and functions carried out by deployment system 306, as well as, virtual computing resources for hosting functional components of the cloud computing platform application 200. In one embodiment, infrastructure platform 308 may be implemented as cloud infrastructure services or other Infrastructure-as-a-Service ("IaaS") that provide computer infrastructure as a service.

Virtualization environment 316 includes an orchestration component 318 (e.g., implemented as a process running in a virtual machine in one embodiment) that monitors the infrastructure resource consumption levels and requirements of deployment system 306 (e.g., by monitoring communications routed through addressing and discovery layer 334 as further detailed below) and provides additional infrastructure resources to deployment system 306 as needed or desired. For example, if deployment system 306 requires additional VMs to host newly deployed functional components of cloud computing platform application 200 and scale the currently running multi-node application to support peak demands, orchestration component 318 can initiate and manage the instantiation of virtual machines on servers $312_1$ to $312_N$ to support such needs. In one example implementation of an embodiment similar to that of FIG. 3, virtualization environment 316 may be implemented by running VMware ESX™ based hypervisor technologies on servers $312_1$ to $312_N$ provided by VMware, Inc. of Palo Alto, Calif. (although it should be recognized that any other virtualization technologies, including Xen® and Microsoft Hyper-V virtualization technologies may be utilized consistent with the teachings herein).

In the embodiment of FIG. 3, deployment system 306 includes a deployment director 320 (e.g., running in one or more VMs) that orchestrates the deployment process for cloud computing platform application 200 according to a deployment manifest that has been submitted to deployment system 306. Deployment director 320 receives instructions of the deployment manifest and interacts with other components of deployment system 306 to generate a logical infrastructure 350 onto which cloud computing platform application 200 is to be deployed. In the embodiment depicted in FIG. 3, deployment director 320 exposes a communications interface, such as a Representative State Transfer (REST) architecture, through which deployment director 320 receives administrative commands and other deployment data (e.g., a release) from a client (e.g., administrative client 304).

Deployment director 320 may provision VMs (identified as stem cell VMs $324_1$ to $324_M$) to host functional components of cloud computing platform application 200, such as cloud controller 202, application execution agents 206, health manager 208, router, 204, service provisioner 210, etc. In the embodiment of FIG. 3, deployment director 320 request infrastructure platform 308 to dynamically create and delete stem cell VMs (e.g., stem cell VMs $324_1$ to $324_M$). Stem cell VMs $324_1$ to $324_M$ are VMs created based on a pre-defined VM template (referred to as "stem cell") that includes a base operating system, an agent 322, and supporting libraries, runtimes, and/or applications. Agents 322 coordinate with deployment director 320 to configure stem cell VMs $324_1$ to $324_M$ to perform various roles of cloud computing platform application 200. Agents 322 applies a particular job to a stem cell VM $324_1$ executing thereon such that stem cell VM $324_1$ performs a particular management role within cloud computing platform application 200 (e.g., the job of one of cloud controller 202, health manager 208, application execution agents 206, etc.).

In addition to provisioning stem cell VMs, deployment director 320 may request infrastructure platform 308 to dynamically create and delete temporary VMs, referred to as workers 330, which perform one or more processing tasks that facilitate deployment. In one embodiment, for example, workers 330 may be created to perform software compilation for component applications and/or libraries to be deployed on stem cell VMs $324_1$ to $324_M$. Workers 330 are configured with a similar configuration as stem cell VMs $324_1$ to $324_M$ (e.g., have an identical virtual hardware specification, architecture, and/or configuration) to enable compiled software to execute on stem cell VMs $324_1$ to $324_M$. Results of processing tasks (e.g., software compilation) and other cached data may be stored in an object store 332 (e.g., blob store) used to hold artifacts generated during the deployment process. Further, deployment director 320 may utilize a set of services 328

(e.g., run in one or more VMs) to facilitate orchestration of the deployment process. For example, a relational database service (e.g., MySQL, etc.), monitoring service, background task scheduler, logging service, messaging service, memory object caching service and the like may comprise services 328.

Addressing and discovery layer 334 provides a common interface through which components of deployment system 306, such as deployment director 320, health monitor 336, services 328, workers 330, and one or more agents 322 executing on stem cell VMs $324_1$ to $324_M$, can communicate and receive notifications. For example, deployment director 320 may utilize addressing and discovery layer 334 to request the provisioning of VMs from infrastructure platform 308 and to provide agents 322 with deployment instructions during deployment of cloud computing platform application 200. Similarly, stem cell VM $324_1$ may communicate through addressing and discovery layer 334 with other stem cell VMs $324_M$ through addressing and discovery layer 334 during deployment of cloud computing platform application 200. In one embodiment, addressing and discovery layer 334 is implemented as a message brokering service (e.g., running in one or more VMs) that defines a common protocol and message format through which components of deployment system 306 can exchange messages and broadcast notifications and other information. In such an embodiment, the components of deployment system 306 establish a connection with the message brokering service (e.g., also sometimes referred to as "subscribing" to the message brokering service), for example, through known authentication techniques (e.g., passwords, etc.) and, once connected to the message brokering service, can provide, receive and request messages, notifications and other similar information to and from other components that have also subscribed to the message brokering system. One example of a message brokering service that may be used in an embodiment is RabbitMQ™ which is based upon the AMPQ (Advanced Message Queuing Protocol) open protocol standard. It should be recognized, however, that alternative interfaces and communication schemes may be implemented for addressing and discovery layer 334 other than such a message brokering service.

Deployment system 306 further comprises a health monitor 336 (e.g., run in a VM) that tracks and maintains the "health" of deployment system 306 by monitoring messages broadcast on addressing and discovery layer 334 by other components of deployment system 306. For example, health monitor 336 may detect a lack of communication from an agent 322 (e.g., run on a stem cell VM) and determine the failure of the stem cell VM (e.g., failure of a component of cloud computing platform application 200). Health monitor 336 may automatically broadcast a request to deployment director 320 to re-start the failed stem cell VM or provision a replacement stem cell VM to perform the same role. Health monitor 336 may be further configured to initiate restart of failed available services or other components of deployment system 306 (e.g., deployment director 320, object store 332, services 328, workers 330, and one or more agents 322 executing on stem cell VMs $324_1$ to $324_M$, etc.).

It should be recognized that deployment system architectures other than the embodiment of FIG. 3 may be implemented consistent with the teachings herein. For example, while FIG. 3 implements deployment system 306 on an infrastructure platform 308 hosted by multi-node application platform 300, it should be recognized that deployment system 306 may be implemented by entities other than multi-node application platform 300, on top of any type of hardware infrastructure, such as on a non-virtualized infrastructure platform, as processes or daemons directly on hardware resources 310. It should further be recognized that embodiments may configure deployment system 306 and infrastructure platform 308 in a loosely coupled manner with communication between deployment system 306 and infrastructure platform 308 only occurring through orchestration component 318 of infrastructure platform 308 which monitors hardware resource consumption by connecting to addressing and discovery layer 334). In such loosely coupled embodiments, it should be recognized that deployment system 306 may be implemented on any infrastructure platform, including on a laptop or personal computer (e.g., in which case, each component of deployment system 306 runs as a separate process or daemon on the laptop or personal computer).

Figure 4:
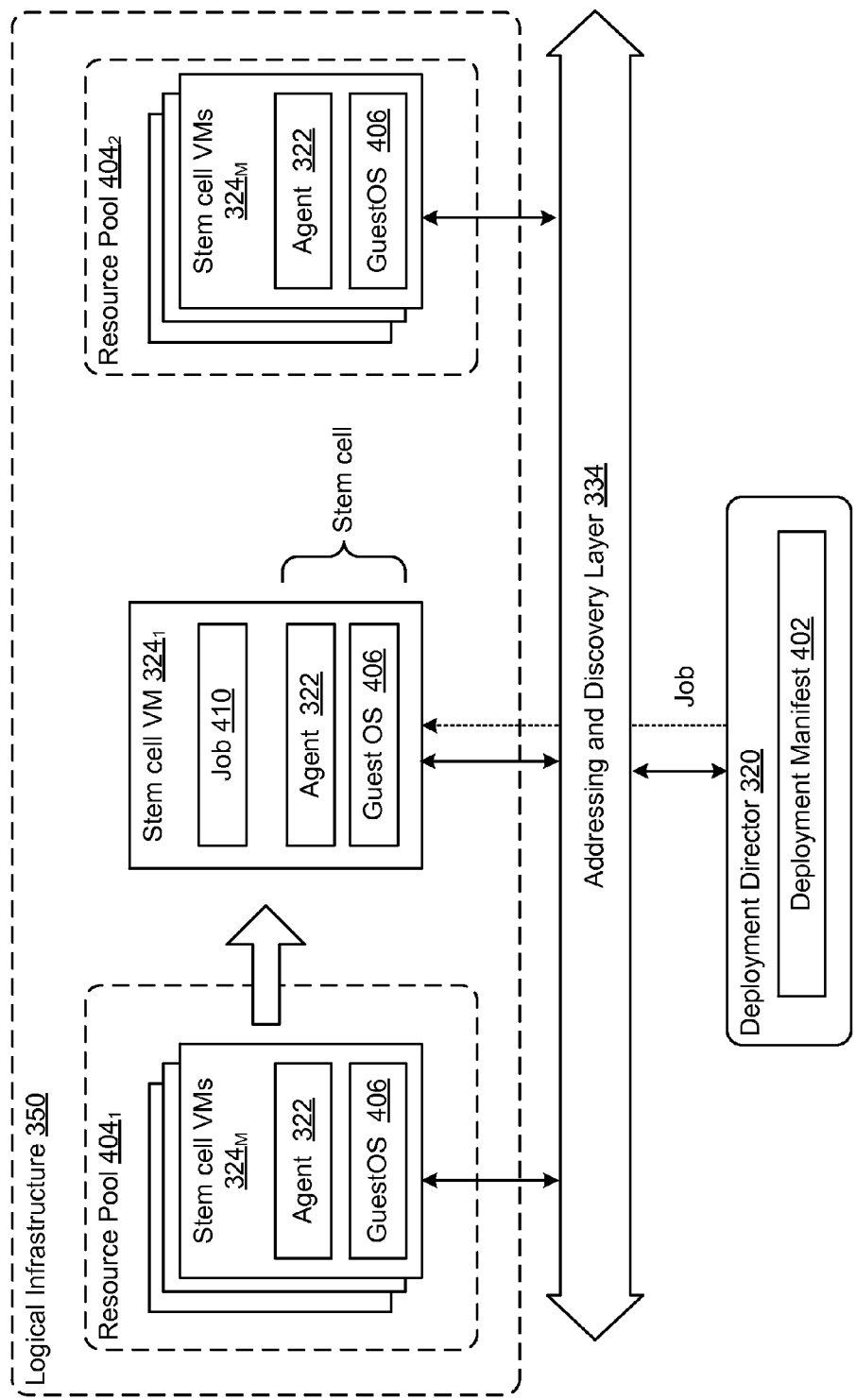
FIG. 4 depicts one embodiment of a deployment director and agents of a deployment system.

FIG. 4 depicts a more detailed view of one embodiment of deployment director 320. Deployment director 320 manages deployment of cloud computing platform application 200 based on a deployment manifest 402 that describes a desired computing environment post-deployment of cloud computing platform application 200. Deployment manifest 402 specifies a release, for example, by name and/or version number, of cloud computing platform application 200 to be deployed. Deployment manifest 402 provides a full specification of cloud computing platform application 200, including specific functional components (e.g., cloud controller 202, health manager 208, application execution agents 206, etc.), a logical infrastructure 350 provided by infrastructure platform 308 (e.g., stem cell VMs $324_M$), the functional components' mapping onto logical infrastructure 350. For example, deployment manifest 402 may specify that ten stem cell VMs should be provisioned to host components comprising cloud computing platform application 200. A system administrator may create deployment manifest 402 for an initial deployment of cloud computing platform application 200, modify deployment manifest 402 to scale up or down an already-deployed cloud computing platform application 200, or update a deployed cloud computing platform application 200. In one particular implementation, deployment manifest 402 is a configuration file formatted in a structured document format, such as YAML or eXtensible Markup Language (XML), having name-value pairs and/or hierarchical sections of name-value pairs that facilitate the deployment process by deployment system 306. Details of deployment manifest 402 are described in conjunction with the sample deployment manifest shown in Table 1 below.

TABLE 1

| Excerpt of Example Deployment Manifest |
|---|
| # Sample Deployment Manifest<br>name: staging<br>director_uuid: 374d1703-c744-42e5-a773-9299c3f1d1a1<br>release:<br>   name: appcloud<br>   version: 40<br>networks:<br>- name: management<br>  subnets:<br>  - reserved:<br>     - 11.23.2.2 - 11.23.2.16<br>     - 11.23.3.238 - 11.23.3.254<br>    static:<br>     - 11.23.2.17 - 11.23.2.128<br>    range: 11.23.2.0/23<br>    gateway: 11.23.2.1<br>    dns:<br>    - 11.22.22.153<br>    - 11.22.22.154<br>    cloud_properties<br>      name: VLAN2002 |

TABLE 1-continued

Excerpt of Example Deployment Manifest

```
- name: apps
  subnets:
  - reserved:
    - 11.23.8.2 - 11.23.8.16
    - 11.23.15.238 - 11.23.15.254
    static:
    - 11.23.8.17 - 11.23.8.255
    - 11.23.9.0 - 11.23.9.255
    range: 11.23.8.0/21
    gateway: 11.23.8.1
    dns:
    - 11.22.22.153
    - 11.22.22.154
    cloud_properties:
      name: VLAN2008
resource_pools:
- name: small
  stemcell:
    name: bosh-stemcell
    version: 0.2.39
  network: management
  size: 14
  cloud_properties:
    ram: 1024
    disk: 4096
    cpu: 1
- name: deas
  stemcell:
    name: bosh-stemcell
    version: 0.2.39
  network: apps
  size: 192
  cloud_properties:
    ram: 16384
    disk: 32768
    cpu: 4
compilation:
  network: management
  cloud_properties:
    ram: 2048
    disk: 4048
    cpu: 4
jobs:
- name: nats
  template: nats
  instances: 1
  resource_pool: medium
  networks:
  - name: apps
    static_ips:
    - 11.23.8.20
- name: cloud_controller
  template: cloud_controller
  instances: 8
  resource_pool: large
    canary_watch_time: 30000
    update_watch_time: 30000
  networks:
  - name: management
    default: [dns, gateway]
  - name: apps
- name: router
  template: router
  instances: 4
  resource_pool: small
  update:
    max_in_flight: 2
  networks:
  - name: apps
    default: [dns, gateway]
  - name: dmz
    static_ips:
    - 11.23.0.16 - 11.23.0.19
- name: health_manager
  template: health_manager
  instances: 1
  resource_pool: small
  networks:
```

TABLE 1-continued

Excerpt of Example Deployment Manifest

```
  - name: management
  - name: apps
    default: [dns, gateway]
- name: dea
  template: dea
  instances: 192
  resource_pool: deas
  update:
    max_in_flight: 12
  networks:
  - name: apps
properties:
  networks:
    apps: apps
    management: management
  nats:
    user: nats
    password: 7x09bnVAqw325
    address: 11.23.8.20
    port: 4222
  router:
    port: 8080
    user: b984H8z82KJk3bb8saZNq72
    password: ZB398bzmnwm3898b8AQ23
```

Deployment manifest 402 may specify a network configuration for cloud computing platform application 200 that includes one or more networks and/or virtual local area networks (VLANs). For example, deployment manifest 402 may define one or more network having settings that specify subnets, static or dynamic IP addresses, gateways and DNS addresses, and reserved Internet Protocol (IP) addresses (i.e., IP addresses not to be used by deployment system 306). In the example deployment in Table 1, a first network labeled "management" and a second network labeled "apps" are specified under a section titled "networks." The network labeled "management" is specified having a static IP address range of 11.23.3.2.17 to 11.23.2.128 with a gateway address of 11.23.2.1 and DNS address of 11.22.22.153. Deployment manifest 402 may specify a "range" of the network that may be used by deployment director 320 as a dynamic pool of IP address, minus static and reserved IP addresses. Gateway and DNS information specified by deployment manifest 402 may be passed onto stem cell VMs and agents 322 executing thereon for their initial launch and bootstrapping. Deployment manifest 402 may include, in each section, one or more pass-through settings (e.g., "cloud_properties") that will be provided to infrastructure platform 308 during deployment.

Based on deployment manifest 402, deployment director 320 generates a logical infrastructure 350 comprising one or more resource pools (identified as resource pools $404_1$ and $404_2$ in FIG. 4) that associate stem cell VMs with a stem cell (e.g., VM template) and a network. For example, a resource pool labeled "small" is associated with a stem cell specified as "bosh-stemcell" version 0.2.39 and with the "management" network defined within deployment manifest 402. A stem cell refers to a VM template that defines a generalized software infrastructure that supports execution of a job provided by deployment director 320 and as specified by deployment manifest 402. In some embodiments, the stem cell is a VM template that includes an agent 322 installed on a guest operating system 406, and any supporting runtimes, frameworks, and libraries for the agent 322. Each resource pool may be assigned a size corresponding to a number of stem cell VMs $324_M$ to be provisioned for the resource pool. For example, deployment director 320 provisions 14 stem cell VMs for the "small" resource pool. Deployment manifest 402 may include pass-through settings for infrastructure platform 308 for provisioning resource pools 404. For example, the "cloud_properties" section indicates "ram," "disk," and "cpu" properties that are intended for use by infrastructure platform 308 in provisioning stem cell VMs (i.e., having 1024 MB of RAM, 4096 Mb of disk space, and 1 CPU) for the "small" resource pool.

Deployment manifest 402 may define a specialized resource pool of workers (e.g., workers 330) for compilation of software packages and/or other ancillary processing tasks during deployment. The specialized resource pool of workers may comprise one or more ancillary VMs provided by infrastructure platform 308. Deployment manifest 402 may specify the number of VMs allocated to the workers resource pool and a network on which compilation may be performed. For example, the "compilation" section above specifies a resource pool having 6 workers assigned to the "management" network for compiling software packages.

Deployment manifest 402 defines a plurality of jobs that may be performed by one or more stem cell VMs 324M as one or more roles in cloud computing platform application 200 (e.g., cloud controller 202, router 204, application execution agents 206, health manager 208, service provisioner 210, services 212, message bus 214, etc.). Deployment manifest 402 specifies a mapping of each job onto logical infrastructure 350 of resource pools 404 and networks specified above. Deployment manifest 402 may specify the number of instances to be deployed of a particular job, which resource pool to use stem cell VMs, and/or which network the job is on. For example, in the example in Table 1, a job labeled as "cloud_controller" is listed as having eight instances (e.g., stem cell VMs 324) drawn from resource pool "large" and assigned to the "management" network. Each job may include a number of configuration file templates, wherein key parameters (e.g., login credentials, IP addresses, ports) are specified as variables.

In one embodiment, deployment manifest 402 includes a "properties" section that provides enables a system administrator to parameterize these configuration file templates. As such, when deployment director 320 deploys cloud computing platform application 200, deployment director 320 may parse the configuration file templates and "fill in" the appropriate parameters based on the corresponding values provided in "properties" section. For example, a router job may have a configuration file that lists a login credential for the router service as variables ("<$user>," "<$password>"). In such an example, deployment director 320 parses out and evaluates the variables based on "user:" and "password:" name-value pairs provided in the properties section. Table 2 lists an example configuration file template embodied as a Ruby on Rails script file (e.g., ERB template) that may be parsed by deployment director 320.

TABLE 2

Example Configuration File Template external_uri: <%= properties.keys.auth_token %>
local_register_only: <%= properties.features.registration %>
instanceyort: <%= properties.cloudcontroller.port II 8080 %>
directories:
  droplets: <%= data_directory %>/droplets
  resources: /shared/resources
amqp:
host: <%= find_job (properties.amqp.job_name, 0) %>
  port: <%= properties.amqp.port II 5672 %>
  vhost: <%= properties.amqp.vhost %>
  user: <%= properties.amqp.user %>
  pass: <%= properties.amqp.password %>

TABLE 2-continued

Figure 5:
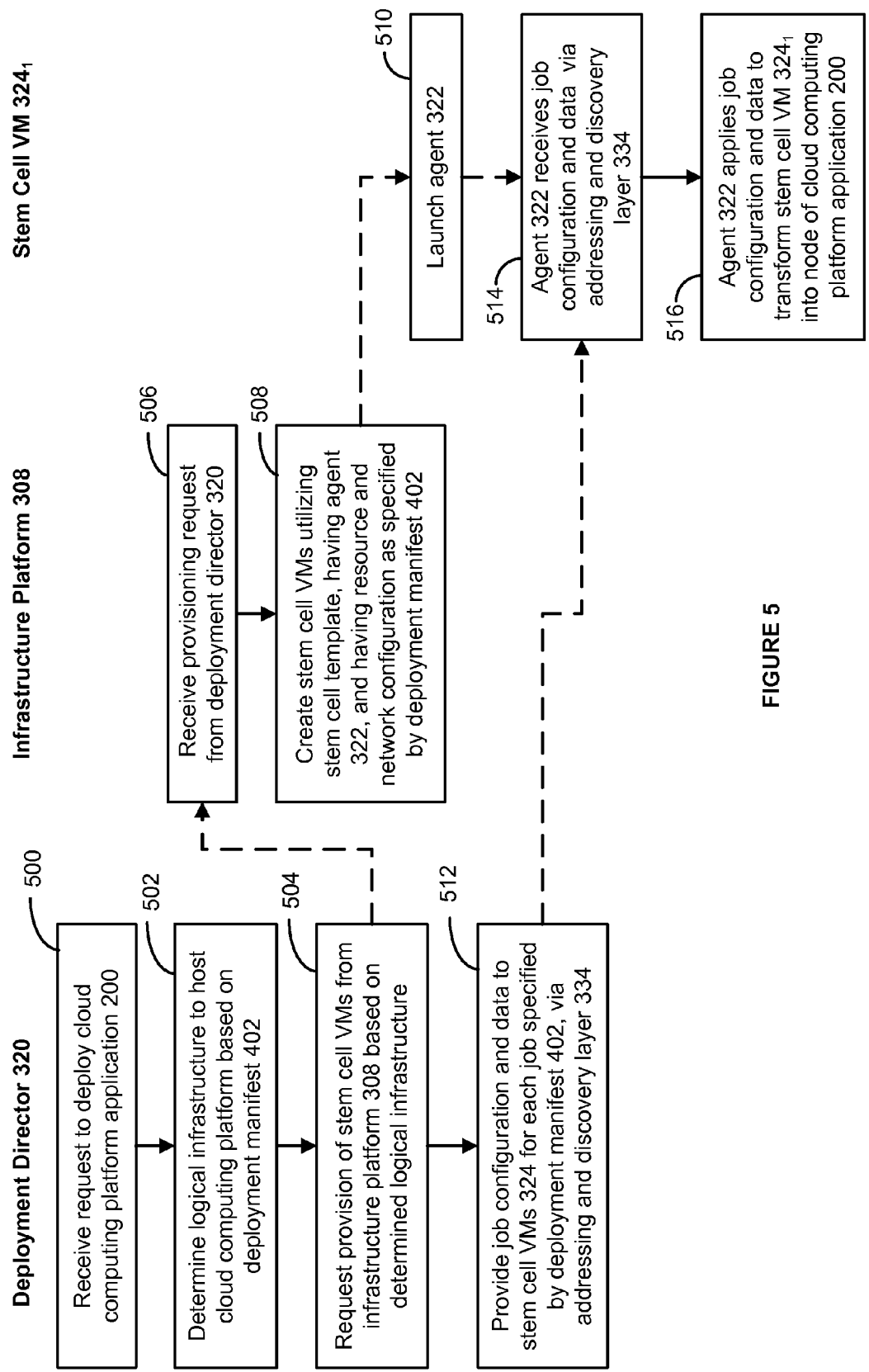
FIG. 5 depicts a flow diagram for deploying a cloud computing platform application by a deployment director.

Example Configuration File Template log_level: <%= properties.logging.cloudcontroller %>
keys:
password: <%= properties.keys.password %>
token: <%= properties.keys.auth_token %>
database_uri: "mysql://<%= find_job(properties.mysql.job_name, ) \
        %>/db"
pid: <%= instance_directory %>/cloudcontroller.pid FIG. 5 depicts a flow diagram for deploying a cloud computing platform application 200 by deployment director 320. In step 500, deployment director 320 receives a request to deploy cloud computing platform application 200, for example, from administrative client 304. A deployment manifest 402 and release may be included with the request or, in the alternative, may have been previously loaded onto deployment director 320 prior to issuance of the deployment request. As described above, deployment manifest 402 provides a specification of cloud computing platform application 200 that deployment director 320 may use to map management jobs needed for supporting cloud computing platform application 200 to virtual computing resources utilized during deployment. In one embodiment, the release includes one or more application packages and configuration files organized into a tape archive file or a "tar" file (also referred to as a "tarball"). It should be recognized that, rather than transmitting the release itself, alternative embodiments may receive the release in step 500 by receiving a reference to download or otherwise access the release, for example, by providing a reference to object store 332, uniform resource locator ("URL"), Git repository, or other similar reference to package data. In such embodiments, the step of receiving the release would thus utilize the provided reference to fetch the release.

In step 502, deployment director 320 determines a logical infrastructure 350 to host cloud computing platform application 200 based on deployment manifest 402. For example, in one embodiment, deployment director 320 processes deployment manifest 402 to determine an allocation of stem cell VMs organized into resource pools and network groupings for hosting nodes of cloud computing platform application 200. In step 506, deployment director 320 transmits a provision request for a plurality of stem cell VMs, based on logical infrastructure 350 determined in step 502, to infrastructure platform 308, which, in turn, receives the provisioning request in step 506. For example, in one embodiment, deployment director 320 may call for provision of instances of a stem cell VM from a cloud infrastructure service provider utilizing a cloud provider Application Programming Interface, sometimes referred to as a "cloud provider interface" (CPI). In step 508, infrastructure platform 308 creates one or more instances of stem cell VMs utilizing a stem cell template having agent 322 pre-installed and having resource and network configurations as specified by deployment manifest 402. For example, in one embodiment, infrastructure platform 308 may create a stem cell VM utilizing a template (e.g., stem cell) having a packaged format such as Open Virtualization Format (OVF) and containing a guest operating system kernel, utilities (e.g., openssh-server, monit), libraries (e.g., libxml, libmysql, libsqlite), runtime dependencies (e.g., Ruby, Java Virtual Machine), and agent 322. In one particular implementation, the stem cell may be generated prior to start of the deployment procedure and stored for later retrieval by infrastructure platform 308 and/or deployment director 320.

In step 510, one or more stem cell VMs (e.g., stem cell VM 324₁) begins operation and launches agent 322. In step 512, deployment director 320 provides job configuration and data to stem cell VMs 324 for each job specified by deployment manifest 402 via addressing and discovery layer 334. For example, deployment director 320 determines that deployment manifest 402 specifies a "cloud controller" job uses eight instances of stem cell VMs drawn from a pre-determined resource pool and from a pre-determined network group. Deployment director 320 provides job configuration and data for the cloud controller job to eight instances of stem cell VMs 324. In step 514, stem cell VMs 324 (e.g., stem cell VM $324_1$) receives the job configuration and data, via address and discovery layer 334. Job configuration and data may include one or more packaged applications, libraries, runtimes, configuration files, metadata, and other supporting data for performing a role within cloud computing platform application 200. In one embodiment, agent 322 may retrieve job configuration and data utilizing a link or address provided by deployment director 320 and corresponding to one or more data objects stored in object store 332.

In step 516, agent 322 applies the received job configuration and data to transform stem cell VM $324_1$ into a distributed node within cloud computing platform application 200. Agent 322 installs one or more application packages of the received job data, utilizes the received job configuration to perform any suitable setup and configuration of the installed software packages, and launches processes for connecting to other deployed jobs of cloud computing platform application 200 and performing one or more specialized tasks within cloud computing platform application 200. For example, in one embodiment, agent 322 may install, configure, and launch one or more application packages for executing a router (e.g., router 204) to forward incoming requests to other components of cloud computing platform application 200 that are running web applications. Deployment director 320 repeats operations of step 512 until all jobs have been deployed onto one or more stem cell VMs 324 as specified by deployment manifest 402. As such, after the deployment procedure has been completed, a plurality of stem cell VMs have transformed into a plurality of interconnected nodes that constitute a deployed cloud computing platform application 200 (e.g., cloud controller 202, application execution agents 206, health manager 208, router 204, service provisioner 210, etc.), as depicted in FIG. 6.

Figure 6:
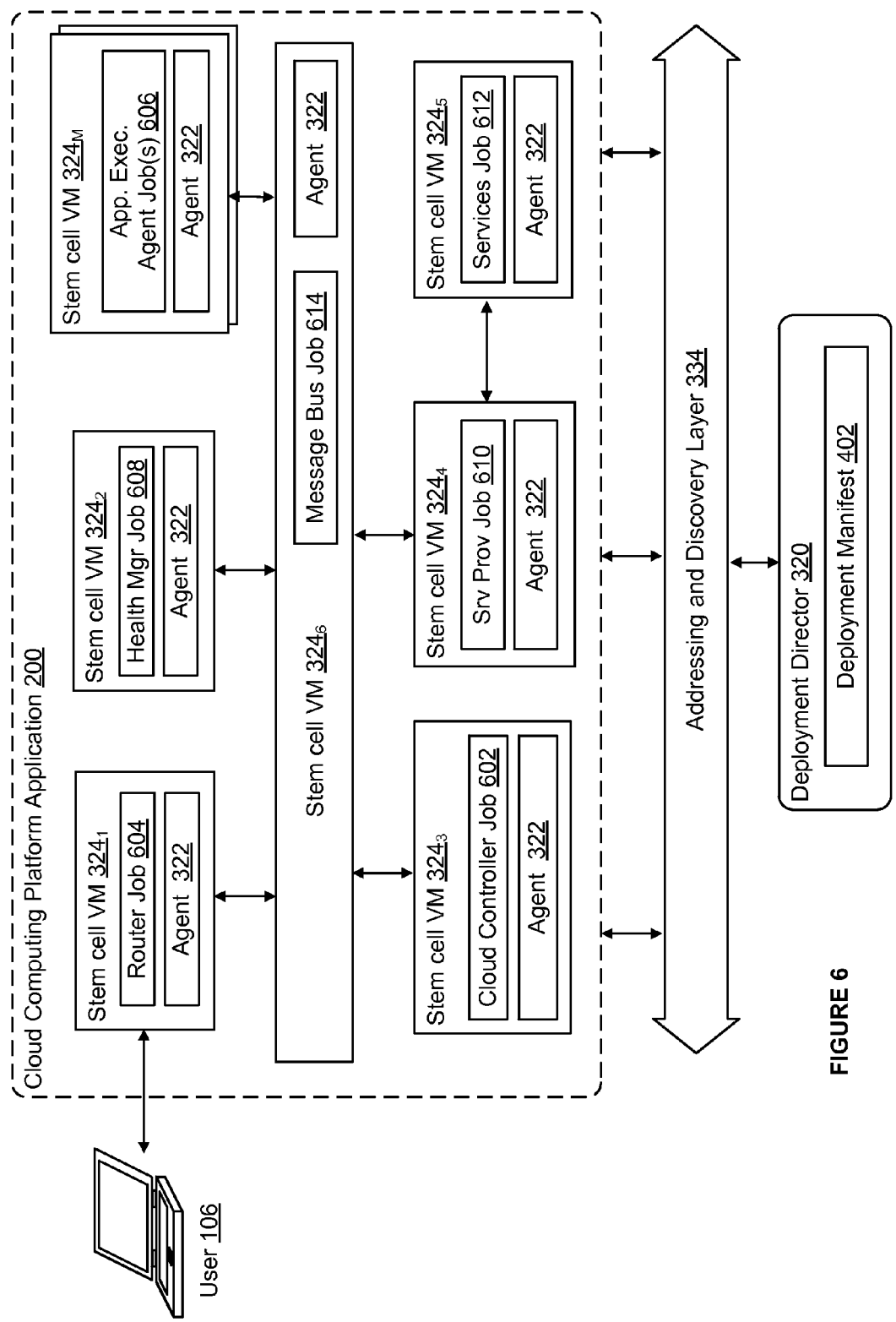
FIG. 6 depicts the deployment system of FIG. 4 after deployment of a cloud computing platform application.

FIG. 6 depicts deployment system 306 of FIG. 4 after deployment of a cloud computing platform application 200 has been completed. After execution of a deployment procedure described above, stem cell VMs (e.g., VMs $324_1$ to $324_M$) from logical infrastructure 350 are "transformed" into nodes of a cloud computing platform application 200 (e.g., router 204, cloud controller 202, health manager 208, application execution agents 206, service provisioner 210, services 212, message bus 214). In the embodiment of FIG. 6, each stem cell VM $324_1$ to $324_M$ has an agent 322 executing thereon to perform a management job (e.g., router job 604, cloud controller job 602, health manager job 608, application execution agent jobs 606, service provisioner job 610, service jobs 612, message bus job 614) that are carried out by cloud computing platform application 200.

Example Release Management System

Figure 7:
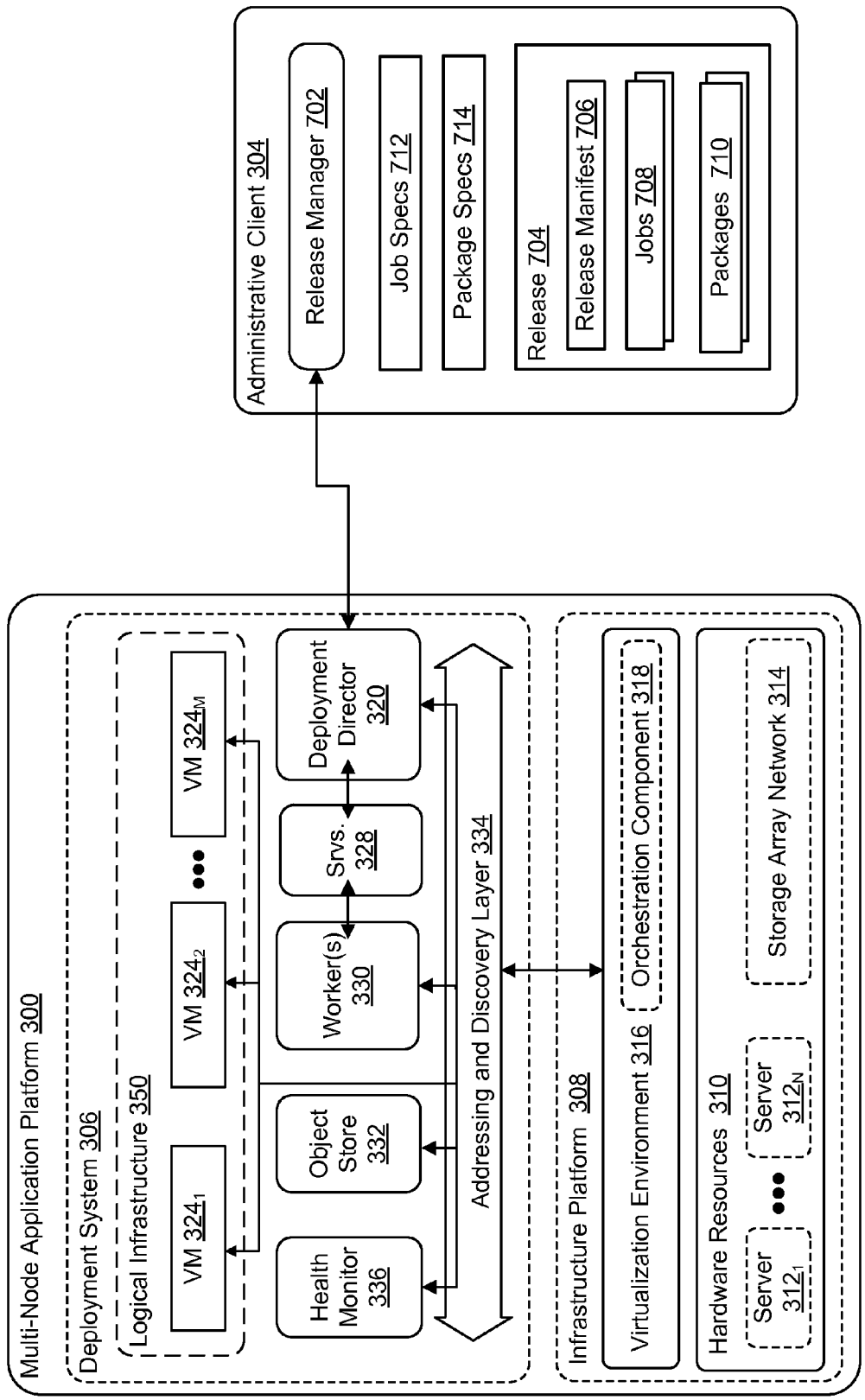
FIG. 7 depicts one embodiment of a release management system for building a version of a multi-node application to be deployed by a deployment system.

FIG. 7 depicts one embodiment of a release management system for building a version of a multi-node application (e.g., cloud computing platform application 200) to be deployed by a deployment system (e.g., deployment system 306). As described above, administrative client 304 is communicatively connected to deployment system 306 to provide one or more releases to deployment system 306 to deploy a cloud computing platform application 200.

Administrative client 304 includes a software module, referred to as a release manager 702, which builds and manages releases 704 of the multi-node application according to techniques described herein. In one embodiment, release manager 702 uses metadata and configurations provided by one or more job specifications 712 and one or more package specifications 714 to build a release 704. Release 704 generally refers to a self-contained bundle of management job definitions, configurations, and application data packages needed to deploy and execute cloud computing platform application 200. Each release 704 represents a frozen version of application data packages and configurations needed to perform the management jobs for providing cloud computing platform services. As shown in FIG. 7, release 704 includes a release manifest 706 that specifies the contents of release 704, a plurality of jobs 708, and a plurality of packages 710. Each job 708 represents a management role in cloud computing platform application 200 to be performed (e.g., by a stem cell VM), and describes what packages 710 should be deployed (e.g., by an agent 322 executing in a stem cell VM) and monitored (e.g., by health monitor 336). Jobs 708 include code and configurations for use with one or more packages 710. Packages 710 includes custom application code configured to perform management jobs specific to cloud computing platform application 200 (e.g., cloud controller, application execution agents), as well as re-usable application services and/or supporting software (e.g., MySQL, RabbitMQ). Packages 710 may contain code stored in machine architecture independent representation (e.g., source code, bytecode), or, alternatively, may include executable runtimes (e.g., "binaries"). In one embodiment, jobs 708 and packages 710 are organized into one or more tape archive files (e.g., tarballs).

Figure 8:
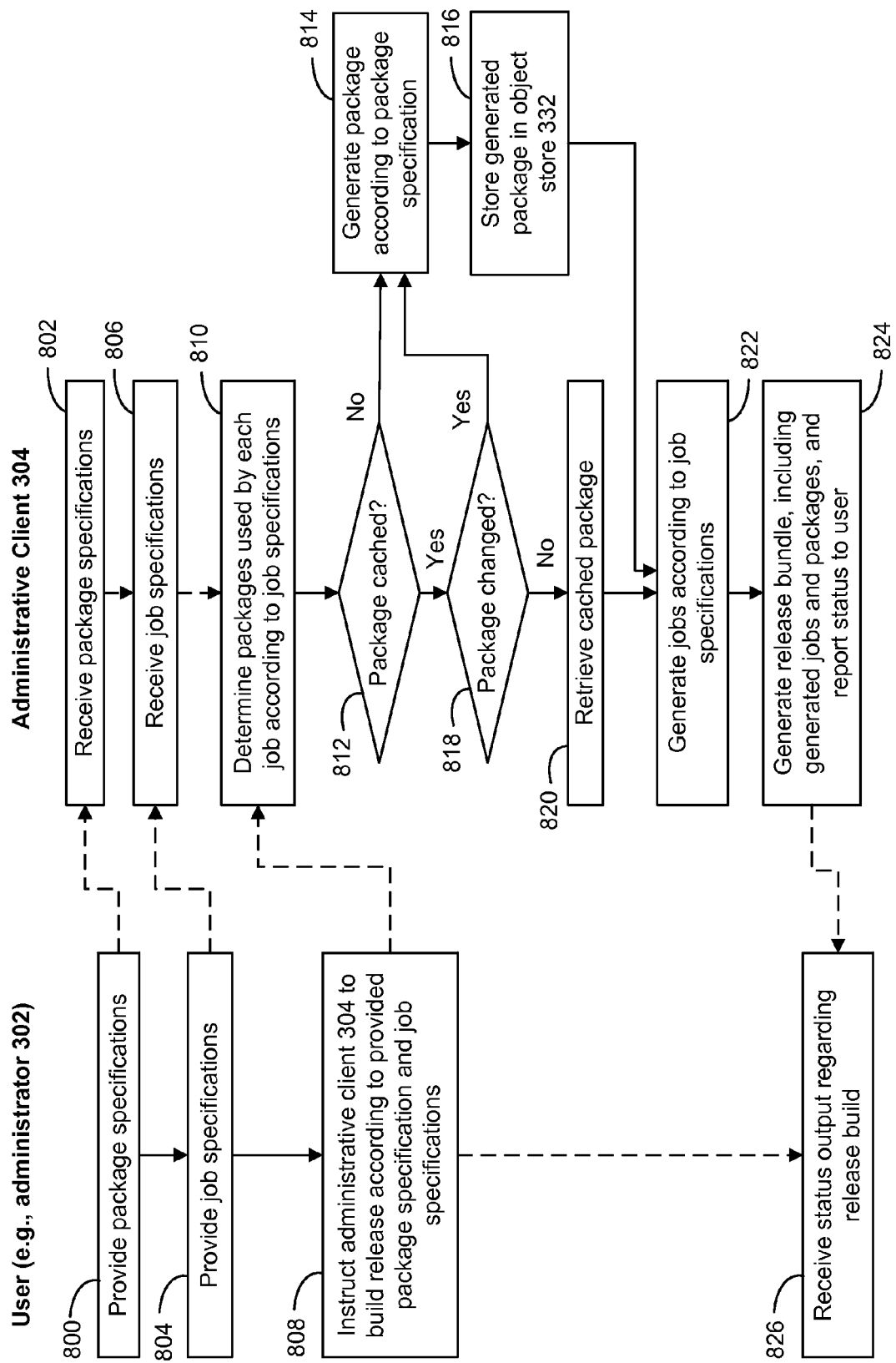
FIG. 8 depicts a flow diagram for generating a release of a cloud computing platform application.

FIG. 8 depicts a flow diagram for generating a release 704 of a cloud computing platform application 200. In step 800, a user (e.g., administrator 302) provides one or more package specifications 714 to administrative client 304 that includes metadata that describes contents of packages 710. While each package specification 714 is a configuration file that corresponds to a single package 710 in the embodiments described below, it is recognized that a single package specification 714 may provide metadata for multiple packages 710.

Package specification 714 includes metadata that specifies contents that are to be included in a package (e.g., package 710) when a release 704 is built (e.g., by release manager 702). Examples of package specification 714 are produced below in Tables 3A and 3B.

TABLE 3A

Sample Package Specification ("controller.pkg")

name: cloudcontroller
packaging: packages/cloudcontroller/packaging
files:
- cloudcontroller/*/*

TABLE 3B

Sample Package Specification ("rabbitmq.pkg")

name: rabbitmq
packaging: packages/rabbitmq/packaging
files:
rabbitmq-server-1.8.0.tar.gz In one embodiment, package specification 714 specifies a name identifier field (e.g., "name: cloudcontroller") that uniquely identifies package 710 from among other packages. Package specification 714 identifies one or more files having application code, configurations, and other application data that represent contents of package 710. For example, package specification 714 may specify a listing of files (e.g., "files: cloudcontroller/*/*," "files: rabbitmq-server-1.8.0.tar.gz") that should be included in package 710. It is recognized that one or more files, scripts, and code specified by package specification 714 (or job specification 712 described later) may be specified by one or more pathnames, URLs, file globs, and any other expression that may be used to reference data stored within a storage system. Package specification 714 further specifies one or more package dependencies that indicate related packages 710 that should be included in release 704. In one embodiment, package specification 714 refers to related packages by their name identifier (e.g., "dependencies: mysql, rabbitmq").

Package specification 714 specifies a preparation script for inclusion in package 710 (e.g., "packaging: packages/cloudcontroller/packaging"). The preparation script is configured to, when executed, prepare package 710 for the environment of deployment system 306. For example, a script for compiling package 710 may include shells commands to unpack package 710 and invoke a "make" command that compiles contents of package 710 to generate an executable runtime compatible with stem cell VMs. In one embodiment, the preparation script is configured to be executed on a virtual machine, such as a worker 330, having a system architecture compatible with stem cell VMs 324. An example preparation script is provided below in Table 4.

TABLE 4

Sample Preparation Script ("rabbitmq/packaging")

!/usr/bin/env bash
tar xzf rabbitmq-server-1.8.0.tar.gz
cd rabbitmq-server-1.8.0
make In step 802, administrative client 304 receives the one or more package specifications 714. In one embodiment, administrative client 304 retains the received package specifications 714 in a local workspace having a directory folder structure configured according to a predetermined convention (e.g., naming convention). For example, package specifications 714 (e.g., "cloudcontroller.pkg," "rabbitmq.pkg") may be placed in a "packages" folder that has sub-directories (e.g., "packages/cloudcontroller/," "packages/rabbitmq/") corresponding to a name identifier provided by each package specification 714. It should be recognized that file paths, file globs, URLs, and other file references provided in package specification 714 (as well as for job specification 712) may be specified relative to the local workspace or to a location within the local workspace determined according to the predetermined convention. In the example above, the location of package files (e.g., "cloudcontroller.tar.gz," "rabbitmq-server-1.8.0.tar.gz") may be specified relative to sub-directories corresponding to name identifiers provided by each package specification (e.g., "packages/cloudcontroller/," "packages/rabbitmq/"). It should be recognized that the location of package files may be in a system directory (e.g., /src/) used to store package files and source code according to conventions of an operating system.

In step 804, the user provides one or more job specifications 712 to administrative client 304 that describes a job 708 that may be executed (e.g., by an agent 322 in deployment system 306). Job specification 712 provides a name identifier field (e.g., "cloudcontroller," "messagebus") that uniquely identifies a particular job 708 from among other jobs. An example job specification 712 is provided below:

TABLE 5

Sample Job Specification (e.g., "cloudcontroller.job")

name: cloudcontroller
monit: jobs/cloudcontroller/monit
configuration:
    jobs/cloudcontroller/configuration/cloudcontroller.yml:
        config/cloudcontroller.yml
    jobs/cloudcontroller/configuration/thin.yml: config/thin.yml
update:
    drain: jobs/cloudcontroller/drain
restart:
    drain: jobs/cloudcontroller/drain
packages:
- cloudcontroller Job specification 712 specifies one or more packages 710 that are used (e.g., by an agent 322) to perform a management role within cloud computing platform application 200. For example, job specification 712 for a cloud controller (e.g., cloud controller 202) may specify a cloud controller package, which includes custom application code for orchestrating cloud services with other components of cloud computing platform application 200, and a MySQL package which includes a relational database that may be used by the cloud controller to store cloud orchestration metadata. In another example, job specification 712 for an application execution agent 206 may specify an application execution agent package, which includes custom application code for receiving and deploying web applications from cloud controller 202, and a Java Runtime Environment package that may be used by application execution agents to provide a Java virtual machine (JVM) to execute web applications. In one embodiment, job specification 712 specifies the one or more packages 710 according to their name identifier specified by package specifications 714.

Job specifications 712 may specify one or more of the same packages 710 in cases where different jobs utilize the same supporting application services or share common code. For example, multiple job specifications 712 may specify an application service, such as MySQL or Redis, which is used by each component of cloud computing platform application 200 in various ways. In another example, job specification 712 for a health monitor (e.g., health monitor 336) may specify the cloud controller package as being used by health monitor 336 because of common code used to orchestrate cloud services with components of cloud computing platform application 200 and monitor components of cloud computing platform application 200.

Job specification 712 specifies one or more configuration files for inclusion in job 708. The configuration files provide configuration settings, which are specific to job 708, for packages 710 and to setup an instance of job 708 on a stem cell VM 324. For example, job specification 712 for a particular job 708 may identify one or more configuration scripts that provide networking configurations (e.g., IP addresses) of other jobs that the particular job 708 depends on. In one embodiment, the configuration files are configuration file templates that are parsed by deployment system 306 (e.g., by deployment director 320) and filled in with values provided from a deployment manifest 402, as described above. In one embodiment, job specification 712 specifies, for each configuration file template, a source file path to the configuration file template (e.g., within the local workspace) and a destination file path (e.g., within a stem cell VM) for where a configuration file generated from the configuration file template should be placed.

In one embodiment, job specification 712 further specifies a monitoring script to be included in job 708. The monitoring script is specific to each job 708 and is configured to, when executed (e.g., by an agent 322, or by direction of health monitor 336), start, stop, and monitor processes that are associated with performing job 708. In one example, a monitoring script may be configured to check for existence of a predetermined process identifier (PID) assigned to job 708. In another example, a monitoring script may be configured to alert health monitor 336 to low available memory or high disk latency conditions during performance of job 708.

In one embodiment, job specification 712 specifies one or more lifecycle scripts to be included in job 708. Each lifecycle script is associated with a lifecycle "hook" such that the lifecycle scripts are invoked (e.g., by an agent 322) when a particular application lifecycle action takes place. Deployment director 320 may use the lifecycle hooks to notify a running instance of job 708 of pending actions, as described later. In one embodiment, the application lifecycle actions include an "update," which represents a change in version of the running instance of job 708, and a "restart," which represents a restart of the running instance of job 708. In the example above, job specification 712 includes a generalized lifecycle hook identified as "drain," however other lifecycle hooks are contemplated, such as a "before" and "after" lifecycle hook to be used before and after updates take place.

In step 806, administrative client 304 receives the one or more job specifications 712. In one embodiment, administrative client 304 retains the received job specifications 712 in a local workspace, described above, having a directory folder structure configured according to a predetermined convention (e.g., naming convention). For example, job specifications 712 (e.g., "cloudcontroller.job," "rabbitmq.job") may be placed in a "jobs/" directory in the local workspace.

In step 808, the user provides an instruction to build a release 704 according to job specifications 712 and package specifications 714. In one implementation, the user may provide a command line instruction (e.g., "create release") to administrative client 304 to build release 704. The user may specify that release 704 be locally built (sometimes referred to as a "developer version" or "dev version"), or alternatively, may specify release 704 as a production-level version (sometimes referred to as a "final version") that is uploaded to object store 332 and made available to other users.

In step 810, responsive to user command to build release 704, administrative client 304 determines one or more packages used by each job according to job specifications 712. In one embodiment, administrative client 304 scans the local workspace in a predetermined location, such as a "jobs" subdirectory, to locate job specifications 712. Administrative client 304 then processes each located job specification 712 to determine which packages need to be built for each job. In one embodiment, administrative client 304 locates and retrieves package specifications 714 for any packages specified in the "packages" section of each job specification 712.

In step 812, for each specified package, administrative client 304 determines whether a cached copy of package 710 may be found in a local cache or, alternatively, in object store 332. In step 814, responsive to determining that package 710 has not been cached, administrative client 304 generates a new package according to package specification 714. In one embodiment, administrative client 304 generates a new package 710 by bundling a preparation script and the one or package files specified by package specification 714 into a package 710 formatted as an archive file, such as a "tar" file. Administrative client 304 then generates a package manifest (e.g., "cloudcontroller.MF," "mysql.MF") that includes the contents of package specification 714 (e.g., name, preparation scripts, file listings) and other metadata for package 710. In one embodiment, the package manifest includes a fingerprint value that is generated to uniquely identify contents of package 710 (e.g., package files, locations, permissions, checksums, etc.) and may be later used determine whether changes have been made to contents of package 710 (e.g., new versions of package files). The package manifest further includes a "build number" that is a versioning identifier for package 710 within release manager 702, and is auto-incremented from a previous build number upon generation of a new changed package 710. In step 816, administrative client 304 stores the generated package 710 in a local storage cache or, alternatively, in object store 332 to be made available later or to other users.

In step 818, responsive to determining that a package 710 has been cached, administrative client 304 determines whether a given package has been changed or modified from the cached copy of package 710 that may represent a previous "version" of the package. A given package may be deemed modified based on changes to package specification 714, preparation scripts, package files and/or other contents specified for the given package. In some embodiments, a test fingerprint value is generated using contents specified by package specification 714 (e.g., package files found in working directory) and compared to a fingerprint value provided by a package manifest of the cached copy of package 710. The given package may be deemed changed if the fingerprint values do not match, and vise versa.

Responsive to determining that a given package has been changed, administrative client 304 proceeds to step 814 to generate a new package 710 according to package specification 714, as described above. Responsive to determining that a given package 710 has not been changed, in step 820, administrative client 304 retrieves the cached copy of package 710. It is recognized that the operations described in steps 812 to 820 may be repeated for each package specified for jobs of cloud computing platform application 200. After retrieving and/or generating all packages, the operations of administrative client 304 proceed to step 822.

In step 822, administrative client 304 generates one or more jobs 708 according to job specifications 712. In one embodiment, administrative client 304 generates a job 708 by bundling monitoring scripts and configuration files specified by job specification 712, as well as a job manifest, into an archive file. Administrative client 304 generates a job manifest that includes the contents of job specification 712, in addition to other metadata for job 708. In one embodiment, the job manifest includes a fingerprint value, for example, as generated by a hash function or other algorithm, which may be used to verify the integrity of contents of job 708 and/or determine whether the contents of job 708 have been modified. The job manifest further includes a "build number" that is a versioning identifier for job 708 within release manager 702, similar to the build number for packages 710. It should be recognized that to facilitate building and managing releases, in one embodiment, administrative client 304 includes a caching and versioning mechanism for jobs 708, similar to the caching and versioning system for packages 710 described above.

In step 824, administrative client 304 generates a release 704 that includes jobs 708 and packages 710. In one embodiment, administrative client 304 generates release 704 by bundling jobs 708 and packages 710 (e.g., as generated and/or retrieved earlier) into a single self-contained archive file (e.g., tarball).

Administrative client 304 generates a release manifest 706 that specifies the contents of release 704 and that is incorporated into release 704. Release manifest 706 includes a name identifier field that provides a text label for release 704 (e.g., "appcloud") and a "build version" field that provides a versioning identifier for release 704 within release manager 702. In one embodiment, administrative client 304 increments the build version field of a release 704 upon determining any change made to jobs 708 and/or packages 710 (e.g., a change in build version of a job 708 or package 710). Release manifest 706 further includes a listing of jobs and packages contained within the release bundle. For example, in an example release manifest 706 produced in Table 6 below, release manifest 706 specifies a version "23" of an "appcloud" release which includes jobs 708 identified as "cloudcontroller," "dea," "healthmanager," "messagebus" and includes packages 710 identified as "dea," "cloudcontroller," "healthmanager," "router," "rabbitmq," and "mysql." In some embodiments, release manifest 706 further includes a checksum value generated for each job and/or package specified. The checksum values may be used for integrity checking during deployment to verify that contents of jobs and packages have not been changed during distribution.

TABLE 6

Excerpt of Sample Release Manifest

```
name: appcloud
version: 23
jobs:
  - name: cloudcontroller
    version: 2
    checksum: 0b1c8aa38dfc5f6fd0d8df890ecfa155498e31ec
  - name: dea
    version: 5
    checksum: 01cf2782a518d808e777bb7ed6fcc6a725f26c3a
  - name: healthmanager
    version: 6
    checksum: 7eeaf339d26fb1c03943199d1ca81404e86259c4
  - name:messagebus
    version: 7
    checksum: 5eb3cfa95350f276fb7b204bad3772050f547511
packages:
  - name: dea
    version: 29
    checksum: 170cfeba3a0ed5d6fdfd325a71f8113d41f85b5e
  - name: cloudcontroller
    version: 25
    checksum: 7c8cef1fe319932a6421a0ed0bf039c9cef8908b
  - name: healthmanager
    version: 2
    checksum: d321e5ebb578847d2c8687d84428a6132dedd412
  - name: router
    version: 3
    checksum: 889bcc596dff4d70984e7359a714896a213ede6a
  - name: rabbitmq
    version: 9
    checksum: 0e5f7d7f580774c1acf3ddaa573205177f4ca047
  - name: mysql
    version: 5
    checksum: fa3415cc2d1f7cc99c7cd0c27c1d5f29f8aaf6b0
```

Upon completion of generating release 704, administrative client 304 reports status back to the user. In step 826, the user receives status output regarding the building of release 704, which may include a verbose output describing what packages 710 and jobs 708 have been changed, modified, newly generated, and/or retrieved from cache. The user may instruct administrative client 304 to transmit release 704 to a deployment system, such as deployment system 306 shown in FIG. 3, and utilized to deploy a cloud computing platform application 200. In one embodiment, release 704 may be provided to deployment director 320 and stored within object store 332 for later access. In one embodiment, administrative client 304 maintains a catalog of built releases (identified by name and version number) may be deployed to test, staging, and/or production environments.

Example Application Lifecycle Management

Embodiments of the invention may be adapted to perform application lifecycle management operations on pre-existing deployments of multi-node applications, such as cloud computing platform application 200. For example, embodiments of the invention allow an operations team to update components of a cloud computing platform application 200 by rolling (e.g., staggering) updates and enabling the components to drain their traffic. Accordingly, embodiments of the invention reduce the impact of upgrades and other changes on a customer's then-running applications. While embodiments of the invention are described for updating cloud computing platform application 200, it should be recognized that the techniques and system provided herein can be extended to other application lifecycle management operations, such as rollbacks, wind-ups, and scaling up and down of a deployment.

Figure 9:
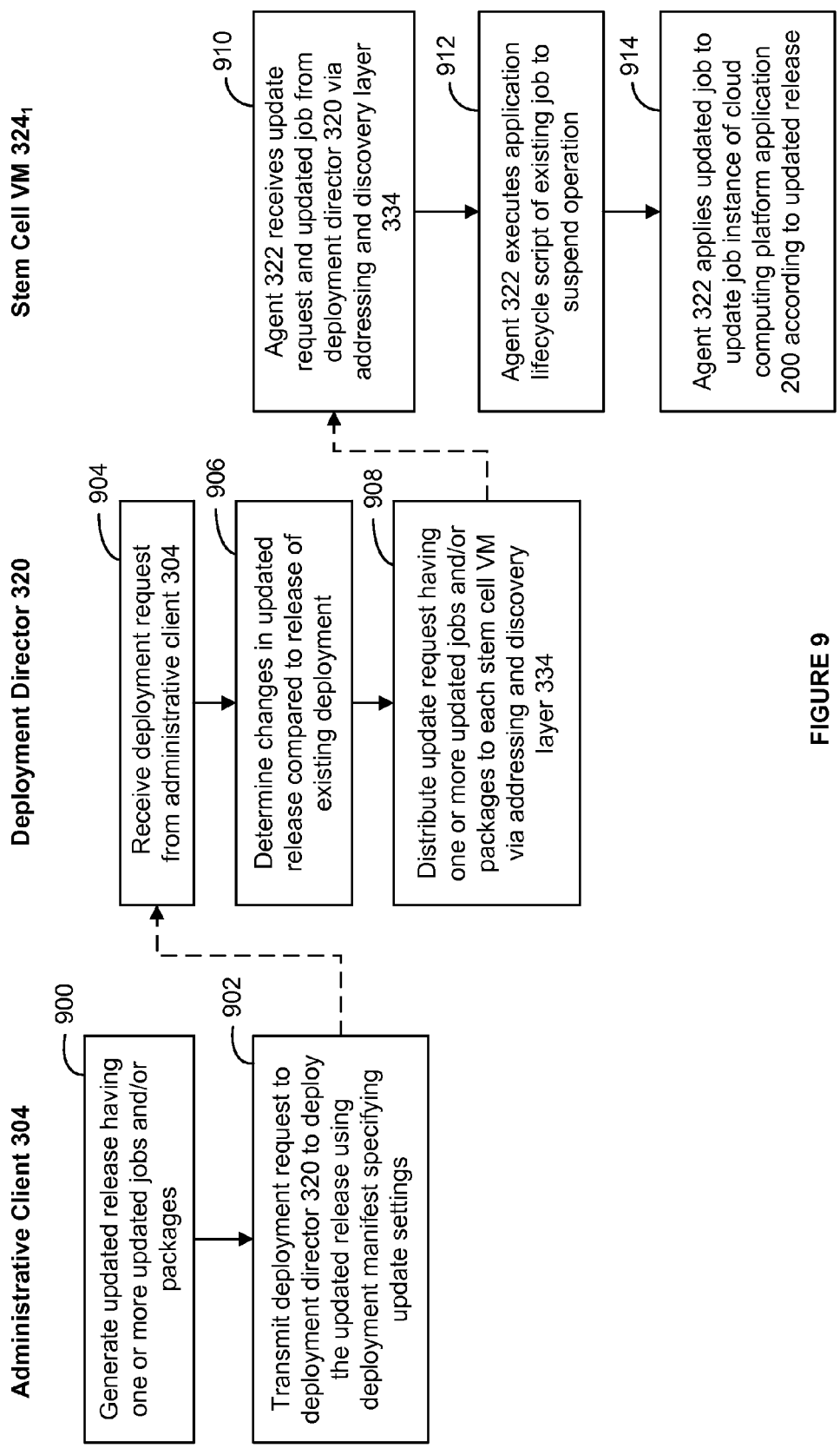
FIG. 9 depicts a flow diagram for deploying a cloud computing platform application by a deployment director.

FIG. 9 depicts a flow diagram for updating an existing deployment of a cloud computing platform application 200 shown in FIG. 6. In step 900, responsive to user input, administrative client 304 generates an updated release (referred to as release 704') that includes changes to be made to an existing deployment of cloud computing platform application 200, such as changes to deployment settings, application code, and/or application configurations embodied as one or more updated jobs (referred to herein as jobs 708') and/or packages (or, packages 710'). In one embodiment, updated release 704' is a self-contained bundle of jobs 708' and packages 710, that can be deployed from scratch on a bare system, rather than a piece of differential data (sometimes referred to as a "diff," "delta," or "patch"). As will be described in detail later, deployment director 320 determines differences between updated release 704' and the release of an existing deployment and selectively applies updates to each component of cloud computing platform application 200.

To generate updated release 704', administrative client 304 detects one or more changes to an existing release, such as the addition of a new job specification 712, removal of an existing job specification 712, modification of an existing job specification 712, modification of contents of a job 708 (e.g., changes to a dependent package or script), addition, removal, and modification of a package specification 714, and contents of a package 710 (e.g., application data bits). In one implementation, administrative client 304 generates updated release manifests, job manifests, and package manifests that include incremented "build version" numbers to represent corresponding changes in each of package 710', job 708', and release 704'. For example, administrative client 304 may detect an upgrade of Java Runtime Environment package (e.g., from version 1.5 to version 1.6) for application execution agent 206. In this example, administrative client 304 generates an updated release 704' having an updated job 708' for application execution agent 206 (to reflect a new dependency on a different version of Java) and an updated package 710' for Java Runtime Environment (that reflects new application bits for the different version of Java).

In step 902, responsive to user input, administrative client 304 transmits a deployment request to deployment director 320 to deploy updated release 704' using a deployment manifest 402' provided by the user. In step 904, deployment director 320 of deployment system 306 receives the deployment request from administrative client 304. The deployment request may include updated release 704' and deployment manifest 402', or alternatively, may include a reference or other resource identifier that can be used to retrieve updated release 704' from object store 332.

Deployment manifest 402' may be similar to deployment manifest 402 described above and extended to include one or more update settings that defines how updates of jobs behave. In one implementation, deployment manifest 402' includes an "update" section having configuration name-value pairs that define update settings for all jobs specified in deployment manifest 402'. An excerpt from an example deployment manifest 402' having update settings is produced below in Table 7. Portions have been omitted for sake of clarity.

TABLE 7

Excerpt of Example Deployment Manifest

```
deployment-name: staging
director_uuid: 374d1703-c744-42e5-a773-9299c3f1d1a1
release:
    name: appcloud
    version: 41
networks:
[...]     # Section omitted
resource_pools:
[...]     # Section omitted
update:
    canaries:1
    canary_watch_time:    30000
    update_watch_time:    10000
    max_in_flight:    5
    max_errors:    2
jobs:
- name: nats
    template: nats
    instances: 1
    resource_pool: medium
    networks:
    - name: apps
        static_ips:
        - 11.23.8.20
- name: cloud_controller
    template: cloud_controller
    instances: 8
    resource_pool: large
    update:
    - canary_watch_time:    30000
        update_watch_time:    30000
    networks:
    - name: management
        default: [dns, gateway]
    - name: apps
- name: router
    template: router
    instances: 4
    resource_pool: small
    update:
        max_in_flight: 2
    networks:
    - name: apps
        default: [dns, gateway]
    - name: dmz
        static_ips:
        - 11.23.0.16 - 11.23.0.19
- name: health_manager
    template: health_manager
    instances: 1
    resource_pool: small
    networks:
    - name: management
        blocks: 0-5
    - name: apps
        default: [dns, gateway]
```

TABLE 7-continued

Excerpt of Example Deployment Manifest

```
- name: dea
    template: dea
    instances: 192
    resource_pool: deas
    update:
        max_in_flight: 20
[...]     # Section omitted
```

In one implementation, deployment manifest 402' includes a "updates" section that provides default update properties that may be overridden in individual jobs. For example, while a global update property may define a "max_in_flight" value of 1, the application execution agent job, which typically have many instances, may specify an override "max_in_flight" value of 12.

Update settings of deployment manifest 402' may specify a number of test instances to be updated for a job. The test instances, referred to as "canaries," are updated prior to other instances of the job are updated, thereby allowing the user to catch deployment errors without bringing down all instances of the job. Update settings may further specify a time interval (referred to as "canary watch time") that indicates a wait period after a job update to a canary test instance before deployment director 320 checks if the canary instance is healthy, running correctly, and has been successfully updated. In the example produced above, the "canaries" setting indicates one test instance is updated prior to other instances and is given a period of 30,000 milliseconds before deployment director 320 checks on the test instance. Update settings of deployment manifest may further specify a second time interval (referred to as a "update watch time") that indicates a wait period after a job update to a non-canary instance before deployment director 320 checks if the job instance is healthy, running correctly, and has been successfully updated.

Update settings of deployment manifest 402' may further specify a number of instances that may be updated concurrently. The number of instances (referred to as a "max in flight" value) enables the user to limit a number of job instances that will be taken down and updated. For example, for a job typically having many instances, such as application execution agent 206, the user may wish to upgrade only 12 instances at a time to reduce the impact on cloud services that deploy web applications.

Update settings of deployment manifest 402' may further specify a maximum number of errors that may occur during a job update without automatically aborting the update operation. In the example shown above, deployment manifest 402 specifies a "max_errors" setting of "2" to allow an update operation to attempt completion without raising more than 2 errors.

Referring back to FIG. 9, in step 906, deployment director 320 determines one or more changes to a deployment of cloud computing application platform 200 by comparing updated release 704' to the release of the existing deployment. In one embodiment, deployment director 320 compares "build versions" of each job 708 and each package 710 used by each job 708 to determine which packages 710 and jobs 708 should be updated. In one implementation, deployment director 320 processes a release manifest of updated release 704' to retrieve deployment metadata and compares the retrieved deployment metadata to metadata stored for existing deployment of cloud computing application platform 200.

In step 908, deployment director 908 distributes update request having one or more updated jobs 708' and/or packages 710' to each stem cell VM running a job instance determined to be updated in step 910, via addressing and discovery layer 334. For example, deployment director 320 may determine that the only change found in an updated release 704' is an upgraded version of a Java Runtime Environment package for an application execution agent job. In this example, deployment director 320 may distribute an update of the application execution agent job, and leave the remaining components of cloud computing platform application 200 untouched. In step 910, agent 322 (e.g., executing on a stem cell VM 324) receives the update request and updated jobs 708' and/or packages 710' from deployment director 320 via addressing and discovery layer 334.

In step 912, agent 322 executes a lifecycle script for existing job 708 to prepare for an update, for example, by gracefully suspending operation of the job instance on stem cell VM 324. The lifecycle scripts may be configured to, when executed by agent 322, cease accepting new requests or work, finish processing of requests or work already in progress (sometimes referred to as "draining"), and notify deployment director 320 of a ready-to-update status. For example, a lifecycle script for an application execution agent job may be configured to stop accepting new web applications for execution, and evacuate running web applications to other running application execution agents.

In one embodiment, the lifecycle script is configured to, when executed by agent 322, determine which component (e.g., package, application service) are affected by an update and to dynamically configure the lifecycle script to allow for major and minor updates. For example, responsive to determining that an update is to a package containing code for application execution agent job, a lifecycle script may leave web applications running while the existing application execution job process is restarted. In contrast, responsive to determining that an update is to other packages supporting the web applications (e.g., Java, Apache Tomcat Server, Ruby interpreter), the lifecycle script may drain the web applications from the job instance by refusing new web applications and evacuating running web applications to other instances of the application execution agent job. In one implementation, the lifecycle scripts for a job 708 may return (e.g., output) an integer value that represents a number of milliseconds to wait before executing a stop command (via the monitoring script) after the lifecycle script has been executed. As such, deployment system 306 may utilize job-specific scripts to avoid killing requests mid-process, thereby reduce service interruptions and down time during updates of cloud computing platform application 200.

In step 914, agent 322 (e.g., executing in stem cell VM 324) applies updated job 708' to update job instance of cloud computing platform application 200 according to updated release 704'. When an updated job 708' is deployed to a stem cell VM 324, agent 322 stores the contents of updated job 708' while retaining contents of previous versions of job 708 to enable rollbacks. In one embodiment, agent 322 stores job 708 in a directory structure having "slots" that represent different build versions of a job (e.g., <deploy_target_dir>/jobs/<job name>/<slot>". An example directory layout (e.g., within stem cell VM 324) is provided in Table 8.

TABLE 8

Excerpt of Deployment Layout

/deploy_target/jobs/cloudcontroller/
/deploy_target/jobs/cloudcontroller/0/
/deploy_target/jobs/cloudcontroller/0/monit TABLE 8-continued Excerpt of Deployment Layout /deploy_target/jobs/cloudcontroller/0/configuration/
/deploy_target/jobs/cloudcontroller/0/drain
/deploy_target/jobs/cloudcontroller/0/packages/
/deploy_target/jobs/cloudcontroller/0/packages/cloudcontroller/ ->
/deploy_target/packages/cloudcontroller/23
/deploy_target/jobs/cloudcontroller/1/...
/deploy_target/jobs/cloudcontroller/2/...
/deploy_target/jobs/cloudcontroller/live ->
deploy_target/jobs/cloudcontroller/1
/deploy_target/jobs/cloudcontroller/data/

As shown, each slot contains a monitoring script (e.g., "monit"), configuration files, lifecycle scripts (e.g., "drain"), packages or references to packages that are associated with a build version of job 708. Multiple versions stored in slots may be used for updates, rollbacks, and troubleshooting of a deployment. For example, if an upgrade (e.g., to build #29) runs incorrectly, agent 322 may quickly revert to a previously running version (e.g., build #28). Each slot keeps track of the live version of job 708 with, for example, a symbolic link or file pointer. A data directory (e.g., "data/") may be used to pass state across updates and versions, such as a list of process identifiers (PIDs) that a previous application execution agent was monitoring.

Figure 10:
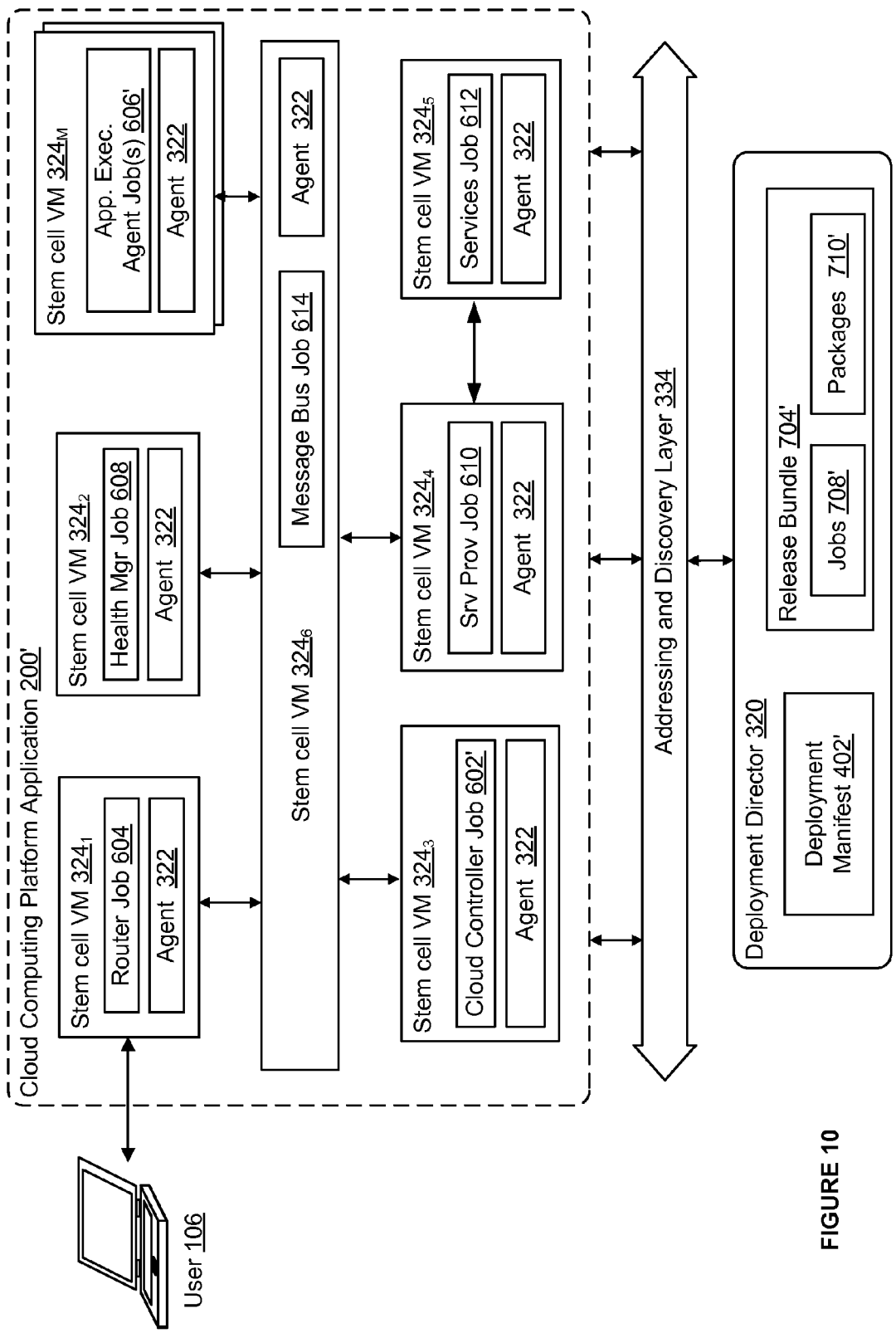
FIG. 10 depicts the cloud computing platform application of FIG. 6 after a deployment of an updated cloud computing platform application.

FIG. 10 depicts the cloud computing platform application 200 of FIG. 6 after a deployment of an updated cloud computing platform application 200' using a deployment manifest 402' that specifies release bundle 704' having updated jobs 708' and 710'. As shown, deployment director 320 has distributed an updated application execution agent job 606' and an updated cloud controller job 602' to deploy updated cloud computing platform application 200', while leaving the remaining jobs (e.g., router job 604, health manager ob 608, message bug job 614, service provisioner job 610, and services job 612) unchanged.

While discussion of release update management has been focused on updates to application code, data, configurations (e.g., jobs and packages) that make up cloud computing platform application 200, it should be recognized that techniques described herein may be extended to modify a logical infrastructure on which cloud computing platform application 200 is deployed (e.g., logical infrastructure 350). For example, deployment manifest 402 for a given release 704 may be modified to increase or decrease stem cell VM instances assigned to a particular job, change virtual resource allocations (e.g., CPU, memory) for stem cell VMs, and alter network groups and addressing. In such an embodiment, deployment director 320 is configured to determine changes to the logical infrastructure 350 and instruct infrastructure platform 308 to transition existing logical infrastructure 350 to an updated logical infrastructure according to an updated release and deployment manifest 402.

It should be recognized that various modifications and changes may be made to the specific embodiments described herein without departing from the broader spirit and scope of the invention as set forth in the appended claims. For example, while the foregoing description has discussed embodiments of a distributed cloud computing platform application, it should be recognized that any network utilizing application can leverage the techniques disclosed herein, and as such, "cloud computing platform application" as used herein shall be interpreted to include any type of multi-node distributed application that employs network based communications. Furthermore, although the foregoing embodiments have focused on the use of stem cell VMs to host deployed jobs, it should be recognized that any "application container" may be used to host deployed jobs, including such stem cell VMs, processes in virtual machines, kernel level containers, processes in traditional non-virtualized operating systems and any other execution environment that provides an isolated environment capable of running application level code. Similarly, while the various components of deployment system 306 have been generally described as being implemented in one or more virtual machines (e.g., for load balancing and scalability purposes), it should be recognized that any type of "application container" (as previously discussed above) can also implement such components, including, for example, traditional non-virtualized computing environment background processes, threads or daemons. Furthermore, any combination of different types of "application containers" to host deployed jobs and implement other components (e.g., deployment director 320, health monitor 336, services 328, object store 332, workers 330, addressing and discovery layer 334, etc.) can comprise any particular deployment system 306 implementation. It should further be recognized that multiple instances of the various components of deployment system 306 (e.g., deployment director 320, health monitor 336, services 328, workers 330, object store 332, etc.) may be implemented in alternative embodiments, for example, for scalability purposes.

The various embodiments described herein may employ various computer-implemented operations involving data stored in computer systems. For example, these operations may require physical manipulation of physical quantities usually, though not necessarily, these quantities may take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs) CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

We claim:

1. A computer processor-implemented method for updating an application having a plurality of functional components that are executed on a plurality of different virtual machines (VMs), the method comprising:

receiving, by a deployment module, a specification for the application to be updated, wherein the specification identifies a set of software components representing an updated version of the application and containing machine architecture independent code which implements each of the functional components of the application;

identifying at least one functional component that is to be updated by comparing the set of software components for the updated version of the application and a set of software components that have been deployed for a currently-deployed application; and directing an agent in each of the VMs that is executing as an instance of the identified functional component to install one or more software components in the VM, thereby causing the VM to execute as an updated instance of the functional component of the application;

wherein the machine architecture independent code which implements each of the functional components of the application comprises a script configured to, when executed by an agent in one of the VMs executing as an instance of the functional component, cease acceptance of new work for the instance of the functional component and suspend operation of the instance of the functional component upon completion of any existing work.

2. The method of claim 1, wherein the directing the agent in each of the VMs further comprises:

directing each agent in a number of VMs executing as an instance of the identified functional component to install the one or more software components in the VM, wherein the number of VMs at a given time does not exceed a value provided by the specification for the application to be updated that specifies maximum number of instances of any one of the functional components that may be updated at a same time.

3. The method of claim 1, wherein the directing the agent in each of the VMs further comprises:
  directing each agent in each of the VMs executing as an instance of the identified functional component to install the one or more software components in the VM;
  initiating, for each of the agents, a timer having a time interval, specified by the specification for the application to be updated, that indicates a time duration permissible for completing an update of the identified functional component; and
  responsive to expiry of the timer, determining whether each agent in each of the VMs has completed update of the identified functional component.

4. The method of claim 1, wherein the directing the agent in each of the VMs further comprises:
  directing each agent in a subset of the VMs executing as an instance of the identified functional component to install the one or more software components in the VM, wherein the subset of VMs are specified by the specification for the application to be updated; and
  responsive to determining that each agent in the subset of VMs has successfully completed an update to the identified functional component, directing each agent in a remainder of the VMs executing as an instance of the identified functional component to install the one or more software components in the VM.

5. The method of claim 4, wherein the directing the agent in each of the VMs further comprises:
  initiating, for each of the agents in the subset of VMs, a timer having a time interval, specified by the specification for the application to be updated, that indicates a time duration permissible for completing, at the subset of VMs, the update of the identified functional component.

6. The method of claim 1, wherein the specification for the application specifies (i) a number of instances of each functional component of the application that is to be deployed, and (ii) hardware properties that would be required by any node executing any one of the functional components.

7. A non-transitory computer-readable storage medium comprising instructions that, when executed in a computing device, update an application having a plurality of functional components that are executed on a plurality of different virtual machines (VMs), by performing the steps of:
  receiving, by a deployment module, a specification for the application to be updated, wherein the specification identifies a set of software components representing an updated version of the application and containing machine architecture independent code which implements each of the functional components of the application;
  identifying at least one functional component that is to be updated by comparing the set of software components for the updated version of the application and a set of software components that have been deployed for a currently-deployed application; and
  directing an agent in each of the VMs that is executing as an instance of the identified functional component to install one or more software components in the VM, thereby causing the VM to execute as an updated instance of the functional component of the application;
  wherein the machine architecture independent code which implements each of the functional components of the application comprises a script configured to, when executed by an agent in one of the VMs executing as an instance of the functional component, cease acceptance of new work for the instance of the functional component and suspend operation of the instance of the functional component upon completion of any existing work.

8. The non-transitory computer-readable storage medium of claim 7, wherein the instructions for directing the agent in each of the VMs further comprising instructions for:
  directing each agent in a number of VMs executing as an instance of the identified functional component to install the one or more software components in the VM, wherein the number of VMs at a given time does not exceed a value provided by the specification for the application to be updated that specifies maximum number of instances of any one of the functional components that may be updated at a same time.

9. The non-transitory computer-readable storage medium of claim 7, wherein the instructions for directing the agent in each of the VMs further comprising instructions for:
  directing each agent in each of the VMs executing as an instance of the identified functional component to install the one or more software components in the VM;
  initiating, for each of the agents, a timer having a time interval, specified by the specification for the application to be updated, that indicates a time duration permissible for completing an update of the identified functional component; and
  responsive to expiry of the timer, determining whether each agent in each of the VMs has completed update of the identified functional component.

10. The non-transitory computer-readable storage medium of claim 7, wherein the instructions for directing the agent in each of the VMs further comprising instructions for:
  directing each agent in a subset of the VMs executing as an instance of the identified functional component to install the one or more software components in the VM, wherein the subset of VMs are specified by the specification for the application to be updated; and
  responsive to determining that each agent in the subset of VMs has successfully completed an update to the identified functional component, directing each agent in a remainder of the VMs executing as an instance of the identified functional component to install the one or more software components in the VM.

11. The non-transitory computer-readable storage medium of claim 10, wherein the instructions for directing the agent in each of the VMs further comprising instructions for:
  initiating, for each of the agents in the subset of VMs, a timer having a time interval, specified by the specification for the application to be updated, that indicates a time duration permissible for completing, at the subset of VMs, the update of the identified functional component.

12. The non-transitory computer-readable storage medium of claim 7, wherein the specification for the application specifies (i) a number of instances of each functional component of the application that is to be deployed, and (ii) hardware properties that would be required by any node executing any one of the functional components.

13. A computer system for updating an application having a plurality of functional components that are executed on a plurality of different virtual machines (VMs), the computer system comprising a system memory and a processor programmed to carry out the steps of:
  receiving, by a deployment module, a specification for the application to be updated, wherein the specification identifies a set of software components representing an updated version of the application and containing machine architecture independent code which implements each of the functional components of the application;

identifying at least one functional component that is to be updated by comparing the set of software components for the updated version of the application and a set of software components that have been deployed for a currently-deployed application; and directing an agent in each of the VMs that is executing as an instance of the identified functional component to install one or more software components in the VM, thereby causing the VM to execute as an updated instance of the functional component of the application;

wherein the machine architecture independent code which implements each of the functional components of the application comprises a script configured to, when executed by an agent in one of the VMs executing as an instance of the functional component, cease acceptance of new work for the instance of the functional component and suspend operation of the instance of the functional component upon completion of any existing work.

14. The computer system of claim 13, wherein the processor is further programmed to carry out the step of:

directing each agent in a number of VMs executing as an instance of the identified functional component to install the one or more software components in the VM, wherein the number of VMs at a given time does not exceed a value provided by the specification for the application to be updated that specifies maximum number of instances of any one of the functional components that may be updated at a same time.

15. The computer system of claim 13, wherein the processor is further programmed to carry out the steps of:

directing each agent in each of the VMs executing as an instance of the identified functional component to install the one or more software components in the VM;

initiating, for each of the agents, a timer having a time interval, specified by the specification for the application to be updated, that indicates a time duration permissible for completing an update of the identified functional component; and responsive to expiry of the timer, determining whether each agent in each of the VMs has completed update of the identified functional component.

16. The computer system of claim 13, wherein the processor is further programmed to carry out the steps of:

directing each agent in a subset of the VMs executing as an instance of the identified functional component to install the one or more software components in the VM, wherein the subset of VMs are specified by the specification for the application to be updated; and responsive to determining that each agent in the subset of VMs has successfully completed an update to the identified functional component, directing each agent in a remainder of the VMs executing as an instance of the identified functional component to install the one or more software components in the VM.

17. The computer system of claim 16, wherein the processor is further programmed to carry out the step of:

initiating, for each of the agents in the subset of VMs, a timer having a time interval, specified by the specification for the application to be updated, that indicates a time duration permissible for completing, at the subset of VMs, the update of the identified functional component.

* * * * *